US012351350B2

(12) United States Patent
Eldridge et al.

(10) Patent No.: US 12,351,350 B2
(45) Date of Patent: Jul. 8, 2025

(54) FILLING SYSTEMS AND RELATED CONTAINER ASSEMBLIES AND METHODS

(71) Applicant: NUTCRACKER THERAPEUTICS, INC., Emeryville, CA (US)

(72) Inventors: Benjamin Eldridge, Danville, CA (US); Igor Khandros, Orinda, CA (US)

(73) Assignee: NUTCRACKER THERAPEUTICS, INC., Emeryville, CA (US)

( * ) Notice: Subject to any disclaimer, the term of this patent is extended or adjusted under 35 U.S.C. 154(b) by 166 days.

(21) Appl. No.: 18/269,522

(22) PCT Filed: Dec. 27, 2021

(86) PCT No.: PCT/IB2021/062331
§ 371 (c)(1),
(2) Date: Jun. 23, 2023

(87) PCT Pub. No.: WO2022/144746
PCT Pub. Date: Jul. 7, 2022

(65) Prior Publication Data

US 2024/0092512 A1 Mar. 21, 2024

Related U.S. Application Data

(60) Provisional application No. 63/131,675, filed on Dec. 29, 2020.

(30) Foreign Application Priority Data

Feb. 4, 2021 (NL) ..................................... 2027499

(51) Int. Cl.
*B65B 3/00* (2006.01)
*A61J 1/05* (2006.01)
(Continued)

(52) U.S. Cl.
CPC ................ *B65B 3/003* (2013.01); *A61J 1/05* (2013.01); *B65B 55/027* (2013.01); *B65D 21/02* (2013.01)

(58) Field of Classification Search
CPC ....... B65B 3/003; B65B 55/027; B65D 21/02; B65D 21/0201; B67C 3/225; A61J 1/05; A61J 1/1412
(Continued)

(56) References Cited

U.S. PATENT DOCUMENTS 3,642,163 A * 2/1972 McFarland ............ B65D 88/08 220/23.2
4,889,692 A * 12/1989 Holtzman ................ G01N 1/28 422/547
(Continued)

FOREIGN PATENT DOCUMENTS

EP 3878759 A1 9/2021
JP 2004 262530 A 9/2004

OTHER PUBLICATIONS

PCT App No. PCT/I B2021 /062331; International Search Report and Written Opinion mailed May 11, 2022.

*Primary Examiner* — Stephen F. Gerrity
(74) *Attorney, Agent, or Firm* — MARSHALL, GERSTEIN & BORUN LLP

(57) ABSTRACT

Filling systems and related container assemblies and methods are disclosed. In an implementation, a container assembly includes a container array, covers, a framework, and a fluidic network. The container array includes containers having distal ends and the covers are coupled to the respective distal ends of the containers. The framework is integral with: 1) the containers, 2) the covers and couples the containers together, or 3) both. The fluidic network includes
(Continued)

fluidic channels that are defined by the framework and enable the containers to be filled in series or in parallel.

18 Claims, 17 Drawing Sheets

(51) Int. Cl.
*B65B 55/02* (2006.01)
*B65D 21/02* (2006.01)

(58) Field of Classification Search
USPC .......... 220/23.2, 23.8, 23.83, 23.86; 422/550
See application file for complete search history.

(56) References Cited

U.S. PATENT DOCUMENTS

| | | | | |
|---|---|---|---|---|
| 9,862,585 | B2 | 1/2018 | Ramnarain et al. | |
| 10,273,025 | B2 | 4/2019 | Py | |
| 2003/0146214 | A1* | 8/2003 | Idoguchi | F17C 13/04 220/23.83 |
| 2009/0253566 | A1* | 10/2009 | Chavarria | B01L 3/5021 414/800 |
| 2011/0303660 | A1* | 12/2011 | Yang et al. | B01D 61/10 220/23.83 |
| 2015/0342828 | A1 | 12/2015 | Bertoni et al. | |
| 2016/0368629 | A1 | 12/2016 | Storey | |
| 2017/0240310 | A1 | 8/2017 | Cormary et al. | |
| 2019/0241287 | A1 | 8/2019 | Goodwin et al. | |
| 2021/0078738 | A1* | 3/2021 | Witt et al. | B65B 51/303 |

* cited by examiner

FILLING SYSTEMS AND RELATED CONTAINER ASSEMBLIES AND METHODS

RELATED APPLICATIONS

This application is a national stage application of PCT/IB21/62331 filed Dec. 27, 2021, which claims priority from Application No. 2027499 filed on Feb. 4, 2021, in the Netherlands and U.S. Provisional Application No. 63/131,675 filed on Dec. 29, 2020, the content of each of which is incorporated by reference herein in their entireties and for all purposes.

BACKGROUND

Drugs such as vaccines are often stored in crimp-top vials prior to use. The vials include a body, a neck, and a flange that defines an opening into an interior cavity of the vial. To fill and seal the vials, nozzles dispense a drug into the interior cavity using the opening and stoppers are inserted into the opening. A crimped metallic sleeve may be positioned over top of the stopper and the flange of the vial to secure the stopper within the vial. The vials may be individually transported using starwheels and/or conveyors during the filling and sealing processes.

SUMMARY

Shortcomings of the prior art can be overcome and benefits as described later in this disclosure can be achieved through the provision of filling systems and related container assemblies and methods. Various implementations of the apparatus and methods are described below, and the apparatus and methods, including and excluding the additional implementations enumerated below, in any combination (provided these combinations are not inconsistent), may overcome these shortcomings and achieve the benefits described herein.

The implementations disclosed herein couple an array of containers (vials) together to form a container assembly including a fluidic network that allows the array of containers to be filled together in parallel or in series. Thus, more containers can be filled faster. As an example, the container assembly and the related systems can fill approximately 10,000 containers in approximately one minute. However, different numbers of containers can be filled at different rates. For example, approximately 1,000 containers may be filled in approximately 30 seconds. Some factors that may affect the number of and/or the rate at which the containers can be filled include the flow rate of the drug flowing into the containers and/or the cross-section of the fluidic channels that flow the drug and/or vent gas from the containers during the filling process.

In a first implementation, a container assembly includes a container array, covers, a framework, and a fluidic network. The container array includes containers having distal ends and the covers are coupled to the respective distal ends of the containers. The framework is integral with: 1) the containers, 2) the covers, or 3) both. The framework coupling the containers together. The fluidic network includes fluidic channels that are defined by the framework and enable the containers to be filled in series or in parallel.

In a second implementation, an apparatus includes a system and a container assembly. The system includes an outlet interface and a liquid source containing a liquid and fluidically coupled to the outlet interface. The container assembly includes containers, covers, and a framework. The containers have distal ends and the covers are coupled to the distal ends of the respective containers. The framework is integral with: 1) the containers, 2) the covers, or 3) both. The framework couples the containers together and defines a fluidic network including an inlet interface coupled to the outlet interface and fluidic channels that fluidically couple the inlet interface and the respective containers. The system is to fill the containers with the liquid in series or in parallel.

In accordance with a third implementation, an apparatus includes a system and a container assembly. The system includes an outlet interface and a liquid source fluidically coupled to the outlet interface. The container assembly includes containers, covers, a fluidic network, and one or more frangible tabs. The containers have openings and the covers are coupled to the containers and extend across the openings. The fluidic network includes an inlet interface and fluidic channels that fluidically couple the inlet interface and the respective containers. The inlet interface is coupled to the outlet interface. One or more frangible tabs couple the respective containers together and at least partially define the fluidic channels. The system is to fill the containers with a liquid from the liquid source by flowing the liquid from the liquid source, through the fluidic channels, and into the respective containers.

In accordance with a fourth implementation, a method includes flowing a liquid through a fluidic network of a framework integral with: 1) containers of a container assembly, 2) covers covering respective ends of the containers, or 3) both. The method also includes filling the containers of the container assembly with the liquid using the fluidic network in series or in parallel.

In accordance with a fifth implementation, a method includes manufacturing a drug and flowing the drug through fluidic channels of a framework to fill containers of a container assembly. The framework is integral with: 1) the containers, 2) covers covering respective openings of the containers, or 3) both.

In accordance with a sixth implementation, a method includes filling containers of a container assembly with a drug using a fluidic network including fluidic channels that are defined by flanges integral with: 1) the containers, 2) covers covering ends of the respective containers, or 3) both; and sealing the fluidic channels defined by the flanges to isolate the drug within the respective containers.

In accordance with a seventh implementation, a container assembly includes a container, a cover, and a drug. The container defines a cavity and includes a base, a side wall coupled to the base, and defining an opening. The container includes a sealing surface formed at a distal end of the container and surrounding the opening. The cover carries a septum positioned over top of the opening and includes a flange coupled to the sealing surface. The drug is contained within the cavity. A pair of radially extending fluidic channels are defined between the flange and the sealing surface of the container and each fluidic channel has a sealed portion to isolate the drug within the container.

In accordance with an eighth implementation, a container assembly includes a container, a cover, and a drug. The container defines a cavity and includes a base, a side wall coupled to the base and defining an opening. The container includes a sealing surface formed at a distal end of the container and surrounding the opening. The cover carries a septum positioned over top of the opening and includes a flange coupled to the sealing surface and defining a pair of radially extending fluidic channels. The drug is contained within the cavity. Each fluidic channel has a sealed portion to isolate the drug within the container.

In accordance with a ninth implementation, a container assembly includes a container and a cover. The container defines a cavity and includes a base, a side wall coupled to the base, and defining an opening, and includes a sealing surface formed at a distal end of the container and surrounding the opening. The cover carries a septum positioned over top of the opening and includes a flange coupled to the sealing surface. A pair of radially extending fluidic channels are defined 1) between the flange and the sealing surface of the container or 2) by the flange. Each fluidic channel has a sealable portion to isolate the cavity of the container.

In accordance with a ninth implementation, a container assembly comprises a container array, covers, and a frame work. The container array includes containers having distal ends. The covers are coupled to the respective distal ends of the containers. The framework is integral with 1) the containers, 2) the covers, or 3) both. The framework couples the containers together, defines a fluidic network, and includes a valve at an entrance of each of the containers. Each of the valves includes a first layer, a second layer, and an elastomer positioned between the first layer and the second layer. A first fluidic channel of the fluidic network is defined between the elastomer and the first layer and in fluid communication with the entrance of the corresponding container and a second fluidic channel of the fluidic network is defined between the elastomer and the second layer. A portion of the elastomer includes a fluid control member and a surface of the second layer opposing the fluid control member comprises a valve seat. The fluid control member is responsive to a change in pressure within the first fluidic channel to shift the fluid control member between an open position in which the fluid control member is spaced from the valve seat to allow fluid flow through the second fluidic channel and into the corresponding container and a closed positioned in which the fluid control member is in engagement with the valve seat to deter fluid flow through the second fluidic channel and into the corresponding container.

In further accordance with the foregoing first, second, third, fourth, fifth, sixth, seventh, eighth, ninth, and/or tenth implementations, an apparatus and/or method may further include or comprise any one or more of the following:

In an implementation, the container array includes a 100×100 array of the containers.

In another implementation, at least some of the containers include a chemically inert material.

In another implementation, at least some of the containers include glass, thermoplastic, or both.

In another implementation, the framework includes tabs that couple pairs of the containers together.

In another implementation, each of the covers include layers and forms the tabs, and the fluidic channels are defined between the layers.

In another implementation, one of the layers of each cover is coupled to the distal end of a corresponding container.

In another implementation, the containers include container tabs and the covers include cover tabs. The cover tabs couple pairs of the covers together.

In another implementation, the fluidic channels are at least partially defined between the container tabs and the cover tabs.

In another implementation, the container tabs and the corresponding containers collectively form a first lattice arrangement and the cover tabs and the corresponding covers collectively form a second lattice arrangement.

In another implementation, the fluidic channels enable the containers to be filled in series.

In another implementation, each container includes a pair of the fluidic channels.

In another implementation, the fluidic channels of the pair oppose each other and are arranged for filling the containers in series.

In another implementation, one of the pair of the fluidic channels includes an entrance into the corresponding container and the other of the pair of fluidic channels includes a vent out of the corresponding container.

In another implementation, the fluidic channels of the pair of fluidic channels are orthogonal to one another.

In another implementation, the covers are thermally bonded to the distal ends of the containers.

In another implementation, the framework includes the covers and each cover includes layers, between which one or more of the fluidic channels are defined.

In another implementation, the covers define a headspace for the corresponding containers.

In another implementation, each cover defines a cover cavity and has a cover top and a cover side wall extending from the cover top and includes a cover interface at a distal end of the cover. The cover cavity defines a headspace for the corresponding container.

In another implementation, each container includes a container base, a container side wall extending from the container base, and a container interface at the distal end of the container. The cover interfaces matingly engage with the corresponding container interfaces, and the fluidic channels are at least partially defined between the cover interfaces and the container interfaces.

In another implementation, the framework includes container flanges and cover flanges, and the container flanges radially extend from the distal ends of the respective containers, and the cover flanges radially extend from distal ends of the respective covers. The container flanges matingly engage the corresponding cover flanges.

In another implementation, each of the covers includes a septum.

In another implementation, the system includes a tabletop system.

In another implementation, the liquid includes a drug.

In another implementation, the system manufactures the liquid.

In another implementation, the system includes a staging area where the system is to stage the container assembly prior to the containers being filled with the liquid.

In another implementation, the system includes a sealing area where the system is to seal the containers and isolates the liquid within the respective containers.

In another implementation, the system includes a filling area where the system is to fill the containers and a mover that is to move the container assembly between the staging area and the filling area.

In another implementation, the mover is further to move the container assembly between the filling area and the sealing area.

In another implementation, the liquid source manufactures the liquid.

In another implementation, the liquid source includes a liquid reservoir that stores the liquid.

In another implementation, the system includes a sealer, and the one or more frangible tabs include one or more closing areas adjacent to the fluidic channels defined by the one or more frangible tabs. The sealer is to interact with the one or more closing areas to close the corresponding fluidic channels and isolate the liquid within the respective containers.

In another implementation, each of the one or more closing areas includes a recess defined by a face of the corresponding frangible tab.

In another implementation, the sealer includes a heating element that is to apply heat to the one or more closing areas to close the corresponding fluidic channels and isolate the liquid within the respective containers.

In another implementation, the sealer includes a laser source that is to apply a laser to the one or more closing areas to close the corresponding fluidic channels and isolate the liquid within the respective containers.

In another implementation, the system includes a container assembly receptacle that receives the containers.

In another implementation, the system further includes one or more sensors to measure a quantity value of the liquid within the respective containers. The system is to compare the measured quantity value to a reference quantity value to determine when the measured quantity value is within a threshold of the reference quantity value.

In another implementation, the fluidic network includes a valve adjacent an entrance into one or more of the containers and the system includes a valve drive assembly that interfaces with the corresponding valves to selectively flow the liquid into the respective containers.

In another implementation, the system is to cause the valve drive assembly to actuate the corresponding valve and stop the flow of the liquid into the corresponding container when the measured quantity value is within a threshold of the reference quantity value.

In another implementation, the one or more sensors include light measurement probes.

In another implementation, the containers include a 100×100 array of the containers.

In another implementation, the liquid includes a vaccine.

In another implementation, the liquid includes a pharmacological composition.

In another implementation, the fluidic network is to flow the liquid into the containers in series.

In another implementation, the fluidic network is to flow the liquid into the containers in parallel.

In another implementation, filling the containers of the container assembly includes filling a 100×100 array of the containers.

In another implementation, the liquid includes a drug and the method further includes manufacturing the drug.

In another implementation, the fluidic network includes fluidic channels. The method includes sealing a portion of the fluidic channels to isolate the liquid within the containers.

In another implementation, the framework includes layers defining fluidic channels of the fluidic network. Filling the containers of the container assembly includes flowing the liquid through the fluidic channels.

In another implementation, the covers include the layers and are thermally bonded to the ends of the respective containers and filling the containers of the container assembly includes flowing the liquid through the fluidic channels of the cover.

In another implementation, the containers and the covers include the layers and filling the containers of the container assembly includes flowing the liquid through the fluidic channels defined between the containers and the covers.

In another implementation, the framework includes a container framework integral with and coupling the containers together and a cover framework integral with and coupling the covers together. The container framework matingly engages the cover framework and defines fluidic channels of the fluidic network. Filling the containers of the container assembly includes flowing the liquid through the fluidic channels.

In another implementation, manufacturing the drug includes manufacturing a vaccine.

In another implementation, the containers include vials including glass or thermoplastic and flowing the drug through the fluidic channels of the framework to fill the containers includes flowing the drug through the fluidic channels of the framework to fill the vials.

In another implementation, flowing the drug through the fluidic channels of the framework to fill the containers includes filling the containers in series.

In another implementation, the fluidic channels include a main fluidic channel and branch fluidic channels coupled to the main fluidic channel and between the respective containers. Flowing the drug through the fluidic channels of the framework includes flowing the drug from the main fluidic channel to the branch fluidic channels to fill the containers in series.

In another implementation, the fluidic channels include a main fluidic channel and branch fluidic channels coupled to the main fluidic channel and the respective containers. Flowing the drug through the fluidic channels of the framework includes flowing the drug from the main fluidic channel to the branch fluidic channels to fill the containers in parallel.

In another implementation, flowing the drug through fluidic channels of the framework to fill the containers of the container assembly includes selectively flowing the drug to the containers.

In another implementation, the method includes selectively actuating a valve at an entrance of each of the containers to selectively flow the drug to the containers.

In another implementation, filling the containers includes filling the containers in series using the fluidic channels.

In another implementation, the method further includes venting gas from the containers while filling the containers of the container assembly with the drug.

In another implementation, filling the containers includes filling the containers in parallel using the fluidic channels.

In another implementation, sealing the fluidic channels includes laser welding a closing area of the flanges.

In another implementation, sealing the fluidic channels includes engaging a closing area of the flanges with a heating element.

In another implementation, sealing the fluidic channels includes moving heating elements into engagement with a closing area of the flanges and closing a portion of the fluidic channels defined by the flanges.

In another implementation, the method includes manufacturing the drug.

In another implementation, the container has a shape of a vial.

In another implementation, the vial includes glass, thermoplastic, or both.

In another implementation, the cover includes layers and the pair of fluidic channels are defined between the layers.

In another implementation, the cover is thermally bonded to the sealing surface of the container.

In another implementation, a snap-fit-connection is formed between the cover and the distal end of the container.

In another implementation, the fluidic channels of the pair of fluidic channels oppose one another.

In another implementation, the fluidic channels of the pair of fluidic channels are orthogonal to one another.

In another implementation, the valve includes an elastomer layer embedded within the framework.

In another implementation, the first layer includes a first chamber and the second layer comprises a second chamber that opposes the first chamber. The second chamber includes the valve seat.

In another implementation, the first chamber is dead ended to enable the pressure within the first fluidic channel to change.

In another implementation, the first chamber is dead ended to enable the pressure within the first fluidic channel to increase or decrease.

The disclosure also includes the following clauses:

1. A container assembly comprising:

a container array comprising containers for containing fluids, especially fluid drugs, and a fluidic network couplable to a drug source, which fluidic network is configured to rapidly dispense drugs from the drug source into the containers of the container array.

2. The container assembly according to clause 1, further comprising a framework comprised in the fluidic network, which framework couples the containers of the container array together.

3. The container assembly according to clause 2, wherein the fluidic network includes fluidic channels configured for filling the containers in series and/or in parallel.

4. The container assembly according to any of the preceding clauses, wherein covers are coupled to distal ends of the containers, preferably wherein the distal ends of the containers define a container opening.

5. The container assembly according to any of the preceding clauses, wherein the fluidic network further comprises a fluidic inlet interface whereby the fluidic network is couplable to the drug source.

6. The container assembly according to any of the clauses 2-5, wherein the framework is integral with the containers and/or with the container covers.

7. The container assembly of any of the preceding clauses, wherein the container array comprises a 100×100 array of the containers.

8. The container assembly of any one of the preceding clauses 4-7, wherein the framework includes tabs that couple pairs of the containers together, which tabs are preferably frangible.

9. The container assembly of clause 8, wherein each of the covers comprises layers and forms the tabs, and wherein the fluidic channels are defined between the layers.

10. The container assembly of clause 9, wherein one of the layers of each cover is coupled to the distal end of a corresponding container.

11. The container assembly of any of the preceding clauses 3-7, wherein the containers comprise container tabs and the covers comprise cover tabs, the cover tabs coupling pairs of the covers together.

12. The container assembly of clause 11, wherein the fluidic channels are at least partially defined between the container tabs and the cover tabs.

13. The container assembly of any one of clauses 11 or 12, wherein the container tabs and the corresponding containers collectively form a first lattice arrangement, and the cover tabs and the corresponding covers collectively form a second lattice arrangement.

14. The container assembly of any one of the preceding clauses 3-13, wherein each container comprises a pair of the fluidic channels.

15. The container assembly of clause 14, wherein the fluidic channels of the pair oppose each other and are arranged for filling the containers in series.

16. The container assembly of any one of clauses 14-15, wherein one of the pair of the fluidic channels comprises an entrance into the corresponding container, and the other of the pair of the fluidic channels comprises a vent out of the corresponding container.

17. The container assembly of any of the clauses 14-16, wherein the fluidic channels of the pair of fluidic channels are orthogonal to one another.

18. The container assembly of any one of the preceding clauses 4-17, wherein the covers are thermally bonded to the distal ends of the containers.

19. The container assembly of any one of the preceding clauses 4-8, wherein the framework includes the covers, and wherein each cover includes layers between which, one or more of the fluidic channels are defined.

20. The container assembly of any one of the preceding clauses 4-19, wherein the covers define a headspace for the corresponding containers.

21. The container assembly of any one of the preceding clauses 4-20, wherein each cover defines a cover cavity and has a cover top and a cover side wall extending from the cover top and including a cover interface at a distal end of the cover, and wherein the cover cavity defines a headspace for the corresponding container.

22. The container assembly of clause 21, wherein each container includes a container base, a container side wall extending from the container base, and a container interface at the distal end of the container, wherein the cover interfaces matingly engage with the corresponding container interfaces, and the fluidic channels are at least partially defined between the cover interfaces and the container interfaces.

23. The container assembly of any one of the preceding clauses 4-22, wherein the framework comprises container flanges and cover flanges, wherein the container flanges radially extend from the distal ends of the respective containers, and wherein the cover flanges radially extend from distal ends of the respective covers, the container flanges matingly engaging the corresponding cover flanges.

24. The container assembly of any one of the preceding clauses, wherein each of the covers comprises a septum.

25. The container assembly according to any of the preceding clauses 1-3, wherein a sealing surface surrounds an opening of the containers, and wherein a container cover carries a septum positioned over the opening, the cover including a flange coupled to the sealing surface, wherein a pair of the fluidic channels extend radially between the flange and the sealing surface, and wherein each fluidic channel has a sealed portion for isolating the drug within each container.

26. The container assembly according to any of the preceding clauses 1-3, further comprising a valve associated with each of the containers, each valve comprising:

a first layer;

a second layer; and an elastomer positioned between the first layer and the second layer, wherein a first fluidic channel of the fluidic network is defined between the elastomer and the first layer and in fluid communication with the opening of the corresponding container, and a second fluidic channel of the fluidic network is defined between the elastomer and the second layer, wherein a portion of the elastomer comprises a fluid control member and a surface of the second layer opposing the fluid control member comprises a valve seat, and wherein the fluid control member is responsive to a change in pressure within the first fluidic channel to shift the fluid control member between an open position in which the fluid control member is spaced from the valve seat to allow fluid flow through the second fluidic channel and into the corresponding container and a closed positioned in which the fluid control member is in engagement with the valve seat to deter fluid flow through the second fluidic channel and into the corresponding container.

27. The container assembly of clause 26, wherein the first layer comprises a first chamber and the second layer comprises a second chamber that opposes the first chamber, the second chamber including the valve seat.

28. The container assembly of any one of clauses 26 or 27, wherein the first chamber is dead ended to enable the pressure within the first fluidic channel to change.

29. An apparatus, comprising:

a system comprising an outlet interface and a liquid source containing a liquid and fluidically coupled to the outlet interface; and a container assembly according to any of the preceding clauses 5-28 wherein the outlet interface is coupled to the inlet interface of the fluidic network of the container assembly.

30. The apparatus of clause 29, wherein the system comprises a table-top system.

31. The apparatus of any one of clauses 29 or 30, wherein the liquid comprises a drug, preferably wherein the system manufactures the liquid.

32. The apparatus of any one of clauses 29-31, wherein the system includes a staging area where the system is to stage the container assembly prior to the containers being filled with the liquid.

33. The apparatus of any one of clauses 29-32, wherein the system includes a filling area where the system is to fill the containers and a mover that is to move the container assembly between the staging area and the filling area.

34. The apparatus of clause 33, wherein the system includes a sealing area where the system is to seal the containers and isolates the liquid within the respective containers, and wherein the mover is further to move the container assembly between the filling area and the sealing area.

35. The apparatus of any one of clauses 29-34, wherein the liquid source manufactures the liquid.

36. The apparatus of any one of clauses 29-35, wherein the liquid source comprises a liquid reservoir that is to store the liquid.

37. The apparatus according to any of the clauses 29-36, wherein the system is to fill the containers with liquid from the liquid source by flowing the liquid from the liquid source, through the fluidic channels, and into the respective containers.

38. The apparatus of clause 37, wherein the system further comprises one or more sensors to measure a quantity value of the liquid within the respective containers, wherein the system is to compare the measured quantity value to a reference quantity value to determine when the measured quantity value is within a threshold of the reference quantity value.

39. The apparatus of any one of clauses 37 or 38, wherein the system includes a valve drive assembly that interfaces with corresponding container valves to selectively flow the liquid into the respective containers.

40. The apparatus of clause 39, wherein the system is configured to cause the valve drive assembly to actuate the corresponding container valve and stop the flow of the liquid into the corresponding container when the measured quantity value is within a threshold of the reference quantity value.

41. The apparatus of any one of clauses 38-40, wherein the one or more sensors comprise light measurement probes.

42. The apparatus of any one of clauses 38-41, wherein the system comprises a sealer, and one or more frangible tabs of the containers include one or more closing areas adjacent to the fluidic channels defined by the one or more frangible tabs; and wherein the sealer interacts with the one or more closing areas to close the corresponding fluidic channels and isolate the liquid within the respective containers.

43. The apparatus of clause 42, wherein each of the one or more closing areas comprises a recess defined by a face of the corresponding frangible tab.

44. The apparatus of any one of clauses 42 or 43, wherein the sealer comprises a heating element that is to apply heat to the one or more closing areas to close the corresponding fluidic channels and isolate the liquid within the respective containers.

45. The apparatus of any one of clauses 42-44, wherein the sealer comprises a laser source that is to apply a laser to the one or more closing areas to close the corresponding fluidic channels and isolate the liquid within the respective containers.

46. The apparatus of any one of clauses 43-45, wherein the system comprises a container assembly receptacle that receives the containers.

47. The apparatus of any one of clauses 29-46, wherein the liquid comprise a vaccine.

48. The apparatus of any one of clauses 29-47, wherein the liquid comprises a pharmacological composition.

49. A method, comprising: flowing a liquid through a container assembly according to any of the preceding clauses 1-28 or an apparatus according to any of the preceding clauses 29-48 and filling the containers of the container assembly with the liquid.

50. The method of any one of clause 49, further comprising sealing a portion of the fluidic channels to isolate the liquid within the containers.

51. The method of clause 49 or 50, wherein filling the containers of the container assembly includes one or more of the following:

flowing the liquid through the fluidic channels between the layers, flowing the liquid through the fluidic channels of the cover, flowing the liquid through the fluidic channels defined between the containers and the covers.

52. The method of any one of clauses 49-51, wherein the framework includes a container framework integral with and coupling the containers together and a cover framework integral with and coupling the covers together and wherein the container framework matingly engages the cover framework and defines fluidic channels of the fluidic network and wherein filling the containers of the container assembly includes flowing the liquid through the fluidic channels.

53. The method of any of the clauses 49-52, wherein the liquid is a drug, preferably a vaccine, and the method comprises manufacturing the drug.

54. The method of clause 53, wherein the fluidic channels comprise a main fluidic channel and branch fluidic channels coupled to the main fluidic channel and between the respective containers and wherein flowing the drug through the fluidic channels of the framework comprises flowing the drug from the main fluidic channel to the branch fluidic channels to fill the containers in series or parallel.

55. The method of any one of clauses 53-54, wherein flowing the drug through fluidic channels of the framework to fill the containers of the container assembly comprises selectively flowing the drug to the containers.

56. The method of clause 55, further comprising selectively actuating a valve at an entrance of each of the containers to selectively flow the drug to the containers.

57. The method of any of the clauses 53-56, further comprising sealing the fluidic channels defined by the container and/or cover flanges to isolate the drug within the respective containers.

58. The method of any one of clauses 53-57, further comprising venting gas from the containers while filling the containers of the container assembly with the drug.

59. The method of any one of clauses 57 or 58, wherein sealing the fluidic channels includes laser welding a closing area of the flanges.

60. The method of any one of clauses 57-59, wherein sealing the fluidic channels includes engaging a closing area of the flanges with a heating element.

61. The method of any one of clauses 58-60, wherein sealing the fluidic channels includes moving heating elements into engagement with a closing area of the flanges and closing a portion of the fluidic channels defined by the flanges.

62. The container assembly of any of the preceding clauses 1-28, or the apparatus of any of the clauses 28-48, wherein the container comprises glass, thermoplastic, or both, preferably wherein the container has a shape of a vial.

63. The container assembly of any of the preceding clauses 1-28, or the apparatus of any of the clauses 28-48, wherein a snap-fit connection is formed between the cover and the distal end of the container.

64. A container assembly according to any of the clauses 1-3, wherein each

- container defines a cavity and comprises a base, a side wall coupled to the base, and defining an opening, and comprising a sealing surface formed at a distal end of the container and surrounding the opening;
- a cover carrying a septum positioned over top of the opening and including a flange coupled to the sealing surface; and
- a drug contained within the cavity,
- wherein a pair of radially extending fluidic channels are defined between the flange and the sealing surface of the container and wherein each fluidic channel has a sealed portion to isolate the drug within the container.

65. The container assembly of clause 64, wherein the cover comprises layers and the pair of fluidic channels are defined between the layers.

66. The container assembly of any one of clauses 64 or 65, wherein the cover is thermally bonded to the sealing surface of the container.

67. The containers of any one of clauses 64-66, wherein a snap-fit connection is formed between the cover and the distal end of the container.

68. The container assembly of any one of clauses 64-67, wherein the container has the shape of a vial.

69. The container assembly of clause 68, wherein the vial comprises glass, thermoplastic, or both.

70. The container assembly of any one of clauses 64-69, wherein the fluidic channels of the pair of fluidic channels oppose one another.

71. The container assembly of any one of clauses 64-70, wherein the fluidic channels of the pair of fluidic channels are orthogonal to one another.

72. A container assembly according to any of the clauses 1-3, wherein each container defines a cavity and comprising a base, a side wall coupled to the base, and defining an opening, and comprising a sealing surface formed at a distal end of the container and surrounding the opening;

- a cover carrying a septum positioned over top of the opening and including a flange coupled to the sealing surface; and
- wherein a pair of radially extending fluidic channels are defined 1) between the flange and the sealing surface of the container or 2) by the flange, and
- wherein each fluidic channel has a sealable portion to isolate the cavity of the container.

73. The container assembly of clause 72, wherein the container has a shape of a vial.

74. The container assembly of any one of clauses 72 or 73, wherein the vial comprises glass, thermoplastic, or both.

75. Use of a container assembly according to any of the clauses 1-28, or an apparatus according to any of the clauses 29-48, for containing drugs, especially vaccines.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect described herein. In particular, all combinations of claimed subject matter appearing at the end of this disclosure are contemplated as being part of the subject matter disclosed herein.

DETAILED DESCRIPTION

Figure 1:
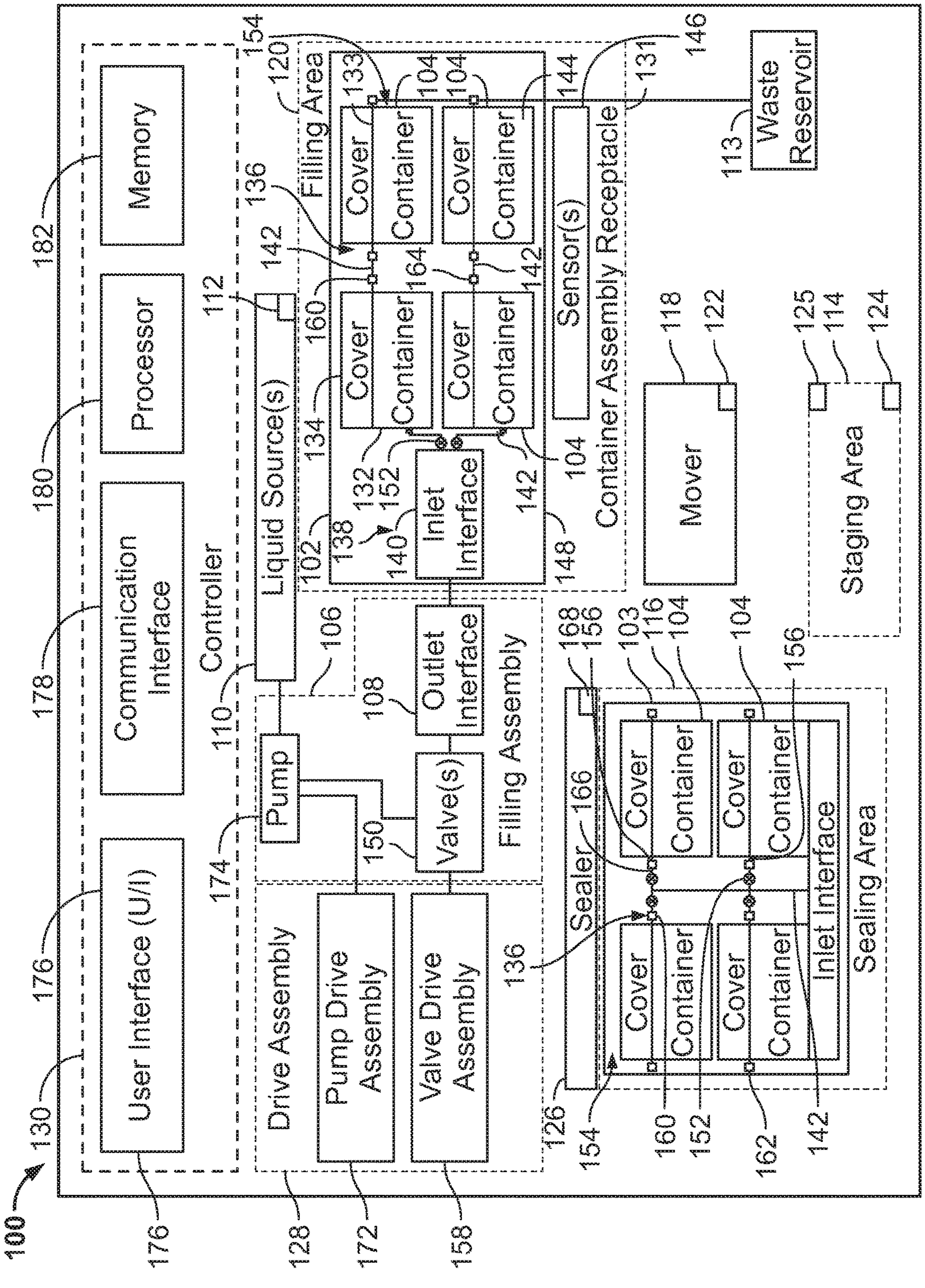
FIG. 1 illustrates a schematic diagram of an implementation of a system in accordance with the teachings of this disclosure.

Although the following text discloses a detailed description of implementations of methods, apparatuses and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

At least one aspect of this disclosure is related to container assemblies and related systems for filling large quantities of containers with a solution containing a drug, which is described below. One benefit of the assemblies and systems described herein is that they enable the filling to be carried out relatively rapidly. One example of a drug is a vaccine. The container assemblies include a container array including containers and a framework coupled to the containers and including a fluidic network arranged to relatively rapidly dispense a drug(s) into the containers. The fluidic network includes an inlet that is couplable to a drug source, fluidic channels that flow the drug from the drug source toward the containers, and outlets positioned to dispense the drug into the containers. The fluidic network can be arranged to flow the drug into the containers in parallel (substantially simultaneously) and/or in series. As set forth herein, the phrase "substantially simultaneously" means less than or equal to 5% of simultaneously, less than or equal to 7% of simultaneously, less than or equal to 3% of simultaneously, etc. including no variation—0%. In some implementations, the containers are filled by cascade filling. The process of cascade filling may include filling the containers in series or may include filling the containers using a combination of filling the containers in series and filling the containers in parallel when, for example, the containers are filled using a 2-dimensional (2D) array.

When the containers are filled in parallel, some of the fluidic channels are used to flow the drug into the respective containers and others of the fluidic channels are used to vent air from the containers as the containers are filled with the drug. When the containers are filled in series, the same fluidic channels that are used to vent air from the containers are used to flow the drug into the subsequent containers once the previous container contains a threshold amount of the drug. Regardless of how the containers are filled, the fluidic channels that allow access to the containers can be closed after the containers are filled with a threshold amount of the drug. In some implementations, the fluidic channels are closed by exposing the area surrounding the fluidic channels to heat or a laser.

FIG. 1 illustrates a schematic diagram of an implementation of a system 100 in accordance with the teachings of this disclosure. In one example, the system 100 may be a table-top system that can be used to relatively quickly stage, fill, and/or seal containers with a liquid such a drug. As used herein, the term "drug" can be used interchangeably with other similar terms and can be used to refer to any type of medicament or therapeutic material including traditional and non-traditional pharmaceuticals, nutraceuticals, supplements, biologics, biologically active agents and compositions, pharmacological compositions, large molecules, biosimilars, bioequivalents, therapeutic antibodies, polypeptides, proteins, small molecules, and generics. Non-therapeutic injectable materials are also encompassed. Some drugs include vaccines such as vaccines against severe acute respiratory syndrome coronavirus 2 (SARS-CoV-2) for protection from coronavirus disease 2019 (COVID-19), vaccines against human severe acute respiratory syndrome coronavirus (SARS-CoV-1) for protection from severe acute respiratory syndrome (SARS) or vaccines against other coronaviruses and/or influenza viruses (e.g., influenza A virus, influenza B virus, and influenza C virus). However, generally, the term drug refers to any substance for the diagnosis, cure, mitigation, treatment, or prevention of disease in people or other animals.

In the implementation shown, the system 100 receives one or more container assemblies 102, 103 including containers 104 and includes, in part, a filling assembly 106 including an outlet interface 108 and a liquid source 110 that is fluidically coupled to the outlet interface 108. The liquid source 110 includes a liquid reservoir 112 that may contain the liquid used to fill the containers 104. In some implementations, the liquid source 110 may manufacture the liquid on-demand and store the liquid in the liquid reservoir 112. In other implementations, the liquid reservoir 112 may be a disposable such that the liquid reservoir 112 containing the liquid is fluidically coupled to the liquid source 110 and/or the system 100 as needed. In other implementations, the liquid may be added to the liquid reservoir 112.

Regardless of how the liquid source 110 obtains the liquid, the system 100 can be used to fill the containers 104 of the container assembly 102 with the liquid in series or in parallel. As the containers 104 are filled with the liquid, gas contained within the containers 104 vents from the containers 104. The containers 104 of the first container assembly 102 are arranged to be filled in series such that the gas contained within a preceding container 104 vents into a subsequent container 104 until liquid begins to cascade to the subsequent container 104. In the implementation shown, the containers 104 are arranged to vent into a waste reservoir 113. To level the liquid between the containers 104 prior to sealing the containers 104 and/or to purge liquid from the associated fluidic channels, the filling assembly 106 may flow a gas and not a liquid into the containers 104 of the container assembly 102 after a liquid filling process is complete. However, the liquid within the containers 104 may be leveled and/or the liquid may be purged in different ways. The containers 104 of the second container assembly 103 are arranged to be filled in parallel such that gas contained within the containers 104 vent to atmosphere or otherwise as the containers 104 are filled. However, the containers 104 may be arranged in different ways while still enabling the containers 104 to be filled relatively quickly and relatively efficiently in one example. Moreover, while not shown, the containers 104 of the second container assembly 103 may also vent into the waste reservoir 113.

The system 100 also includes a staging area 114 where the system 100 stages and/or assembles the container assembly 102, 103 and/or its containers 104 prior to the containers 104 being filled and a sealing area 116 where the system 100 seals the containers 104 and isolates the liquid within the respective containers 104. The system 100 includes a mover 118 that can be used to move the container assemblies 102 between the staging area 114, the sealing area 116, and a filling area 120 where the containers 104 are filled with the liquid. The mover 118 may include one or more moving components 122 such as a robot and/or a conveyor and the staging area 114 may include one or more staging components 124 such as a conveyor(s), a screw(s), a starwheel(s), etc. In some implementations, the staging area 114 includes one or more staging components 125 that can be used to insert or otherwise couple the containers 104 to a framework 136 as further disclosed below to assemble the container assemblies 102 and/or 103. In some implementations, the staging components 125 includes an insertion machine, which may be, for example, a relatively high-speed insertion machine. However, additional or different staging components 125 may be used. While the staging components 125 are shown being included with the system 100, in other implementations, the staging components 125 may be provided in another location such as at another system that is, for example, off sight and/or in a different location. When the system 100 does not include the staging components 125, the container assemblies 102 and/or 103 may be shipped to where the system 100 is located and/or where the containers 104 are to be filled. In one implementation, the containers 104 can be vials (e.g., ones comprising glass) fabricated at a different location than the system 100 before filling. In this example, the prefabricated vials may be inserted into a framework by a suitable technique, such as by a high speed insertion machine. The framework (with the vials inserted) may then be sterilized and then transported to the systems 100 described herein so that the vials are filled by the systems 100 or the methods described herein. The system 100 also includes a sealer 126, a drive assembly 128, and a controller 130. The controller 130 is electrically and/or communicatively coupled to the filling assembly 106, the liquid source 110, the mover 118, the moving components 122, the staging components 124, the sealer 126, and the drive assembly 128 to perform various functions as disclosed herein.

Referring now to the container assembly 102, 103, the container assemblies 102, 103 are shown disposed in a container assembly receptacle 131 and the sealing area 116, respectively, and include the containers 104 that each have a distal end 132 and define an opening 133. Covers 134 are coupled to the distal ends 132 of the containers 104 and extend across the openings 133. The covers 134 may be thermally bonded to the distal ends 132 of the containers 104 or the covers 134 may be coupled to the containers 104 in different ways. For example, the covers 134 may be coupled to the containers 104 using a snap-connection or using a crimped metallic sleeve.

In the implementation shown, the container assembly 102 also includes the framework 136 that is integral with the containers 104 and/or the covers 134 and couples the containers 104 together. Thus, the container assembly 102 can be a monolithic structure.

The framework 136 also defines a fluidic network 138 including an inlet interface 140 coupled to the outlet interface 108 of the system 100 and including fluidic channels 142 that fluidically couple the inlet interface 140 and the respective containers 104. Advantageously, integrally forming the framework 136 with the containers 104 and/or the covers 134 allows the container assembly 102 to be relatively efficiently and relatively easily coupled to the system 100 and for the containers 104 to be relatively quickly filled with the liquid in one example. When the containers 104 of the first container assembly 102 are filled in series, the containers 104 closer to the inlet interface 140 may be filled before the containers 104 farther away from the inlet interface 140 and, when the containers of the second container assembly 103 are filled in parallel, all of the containers 104 are filled at approximately the same time.

To measure a quantity of the liquid within an internal cavity 144 of the containers 104, the system 100 includes one or more sensors 146. The sensors 146 may be positioned within and/or adjacent to the container assembly receptacle 131, which may be referred to as a nest. The sensors 146 may include liquid level sensors, optical sensors, light probes, capacitive liquid level sensors, etc. However, other types of sensors 146 may be suitable to measure the quantity of the liquid within the containers 104.

When the system 100 fills the first container assembly 102 in series, the sensors 146 may be positioned to measure the liquid level of the containers 104 at an assembly end 148 of the container assembly 102 because once the containers 104 at the assembly end 148 contain the threshold amount of the liquid, the containers 104 closer to the inlet interface 140 will also contain the threshold amount of the liquid. When the system 100 fills the second container assembly 103 in parallel, the sensors 146 may be positioned to measure the liquid level of the containers 104 closer to the inlet interface 140 and/or farther from the inlet interface 140 because the containers 104 are filled at substantially the same time. Regardless of how the containers 104 are filled, any number of the sensors 146 may be included in any position to enable the system 100 to determine a fill level within one or more of the containers 104 at any particular time, for example. The controller 130 of the system 100 can access the measured quantity values from the sensors 146 and compare the measured quantity value to a reference quantity value to determine when the measured quantity value is within a threshold of the reference quantity value. Put another way, the system 100 uses the sensor data to determine when the containers 104 are filled with liquid.

The fill assembly 106 of the system 100 and/or the container assemblies 102, 103 include one or more valves 150, 152 that are selectively actuatable to control the flow of the liquid through the fluidic channels 142 and/or into the containers 104. One or more of the valves 150, 152 may be a rotary valve, a membrane valve, a pinch valve, a flat valve, a solenoid valve, a check valve, a piezo valve, etc. However, other types of valves 150, 152 may be suitable. In implementations in which the valves 152 are provided with the container assemblies 103, the framework 136 may include the valves 152. The valves 152 may include an elastomer layer embedded or otherwise coupled to the framework 136 (see, for example, FIG. 5). The valve drive assembly 158 may use pneumatic pressure to control (e.g., to actuate) the valves 152. However, the valves 152 may be actuated in other ways to allow the containers 104 to be individually filled. In the implementation shown, the containers 104 of the container assemblies 102, 103 are arranged in rows 154 and the valves 152 are arranged to selectively control the flow of the liquid into the containers 104 of the respective rows 154 or into individual containers 104. For the first container assembly 102 shown, the containers are 104 arranged to be filled in series and a valve 152 is disposed between the inlet interface 140 and the first container 104 of each row 154 of the containers 104 such that actuating the valve 152 controls the flow of the liquid into the containers 104 of the corresponding row 154. For the second container assembly 103, the containers 104 are arranged to be filled in parallel and one of the valves 152 is disposed adjacent an entrance 156 of each of the containers 104 such that actuating the valve 152 controls the flow of the liquid to each individual container 104. Regardless of how the valves 152, 154 are arranged, a valve drive assembly 158 of the drive assembly 128 interfaces with the valves 152 and/or 154 to control the position of the valves 152 and/or 154. In some implementations, the controller 130 causes the valve drive assembly 158 to actuate the corresponding valve 150, 152 and stop the flow of the liquid into one or more of the containers 104 when the measured quantity value is within a threshold of the reference quantity value. Thus, when filling the containers 104 of the second container assembly 103 in parallel, the controller 130 causes the valve drive assembly 158 to close individual valves 152 in response to the sensor data from the sensors 146 indicating that the corresponding container 104 contains the threshold quantity value. As disclosed above, the valves 152 of the second container assembly 104 may be include an elastic layer coupled to the framework 136 that allows the valves 152 to be pneumatically controlled. While the system 100 is shown including the sensors 146, in other implementations, the sensors 146 may be omitted and the system 100 may be calibrated such that the valve drive assembly 158 actuates the valves 150, 152 to stop flowing the liquid into the containers 104 after a threshold amount of time. However, the system 100 may use other methods to determine when the measured quantity value is within a threshold of the reference quantity value. To enable the fluidic channels 142 leading to the internal cavity 144 of the containers 104 to be sealed, the framework 136 of the container assembly 102, 103 may include one or more closing areas 160 that the sealer 126 interacts with to close and/or seal the corresponding fluidic channel 142 and isolate the liquid within the container 104. As set forth herein, the phrase "closing the fluidic channel 142," or similar terminology means that the fluidic channel 142 has a portion that is fluidically sealed to deter the ingress of air or other foreign particles into the container 104. Put another way, closing the fluidic channels 142 enables the internal cavity 144 of the container 104 and the contents of the container 104 to remain sterile. As set forth herein, the phrase "isolate the liquid within the container 104" or similar terminology means that the container 104 is fluidically sealed to deter the ingress of air or other foreign particles into the container 104. In some implementations, the closing areas 160 are formed by a portion 162 of the framework 136 having a reduced thickness. For example, the portion 162 may be formed by a recess 164 defined by a face 166 of the framework 136. The face 166 may be positioned toward the sealer 126 when the container assembly 102, 103 is in the sealing area 116.

The sealer 126 may include one or more sealing components 168 such as a heating element(s) and/or a laser source(s). The drive assembly 128 may include one or more actuators that are arranged to move the sealer 126 into position to close the fluidic channels 142. When the sealer 126 includes the heating element, the drive assembly 128 can move the heating element adjacent to or into engagement with the closing areas 160 to melt the framework 136 surrounding the fluidic channel 142 and close the fluidic channel 142. The heating elements may be implemented as a hot knife or an ultrasonic welder. In some implementations, a plurality of the heating elements are coupled together such that the drive assembly 128 can move the plurality of heating elements in tandem and into engagement with the closing areas 160 of more than one of the containers 104 at substantially the same time. Similarly, when the sealer 126 includes the laser source(s), the drive assembly 128 can move the laser source into position to allow the laser emitted therefrom to melt the framework 136 surrounding the fluidic channel 142 and close the fluidic channel 142.

Referring now to the drive assembly 128, in the implementation shown, the drive assembly 128 includes the valve drive assembly 158 and the pump drive assembly 172. The valve drive assembly 158 interfaces with the valve 150 of the filling assembly 106 and/or the valves 152 of the container assemblies 102, 103 to control the position of the valves 150, 152. The pump drive assembly 172 interfaces with a pump 174 of the filling assembly 106 to pump the liquid from the liquid source 110 to the container assembly 102.

Referring to the controller 130, in the implementation shown, the controller 130 includes a user interface 176, a communication interface 178, one or more processors 180, and a memory 182 storing instructions executable by the one or more processors 180 to perform various functions including the disclosed implementations. The user interface 176, the communication interface 178, and the memory 182 are electrically and/or communicatively coupled to the one or more processors 180.

In an implementation, the user interface 176 receives input from a user and provides information to the user associated with the operation of the system 100 and/or an analysis taking place. The user interface 176 may include a touch screen, a display, a key board, a speaker(s), a mouse, a track ball, and/or a voice recognition system. The touch screen and/or the display may display a graphical user interface (GUI).

In an implementation, the communication interface 178 enables communication between the system 100 and a remote system(s) (e.g., computers) using a network(s). The network(s) may include an intranet, a local-area network (LAN), a wide-area network (WAN), the intranet, etc. Some of the communications provided to the remote system may be associated with a manufacturing process(es), a staging process(es), a filling process(es), and/or a sealing process (es), etc. generated or otherwise obtained by the system 100. Some of the communications provided to the system 100 may be associated with a manufacturing process(es), a staging process(es), a filling process(es), and/or a sealing process(es) to be executed by the system 100.

The one or more processors 180 and/or the system 100 may include one or more of a processor-based system(s) or a microprocessor-based system(s). In some implementations, the one or more processors 180 and/or the system 100 includes a reduced-instruction set computer(s) (RISC), an application specific integrated circuit(s) (ASICs), a field programmable gate array(s) (FPGAs), a field programmable logic device(s) (FPLD(s)), a logic circuit(s), and/or another logic-based device executing various functions including the ones described herein.

The memory 182 can include one or more of a hard disk drive, a flash memory, a read-only memory (ROM), erasable programmable read-only memory (EPROM), electrically erasable programmable read-only memory (EEPROM), a random-access memory (RAM), non-volatile RAM (NVRAM) memory, a compact disk (CD), a digital versatile disk (DVD), a cache, and/or any other storage device or storage disk in which information is stored for any duration (e.g., permanently, temporarily, for extended periods of time, for buffering, for caching).

Figure 2:
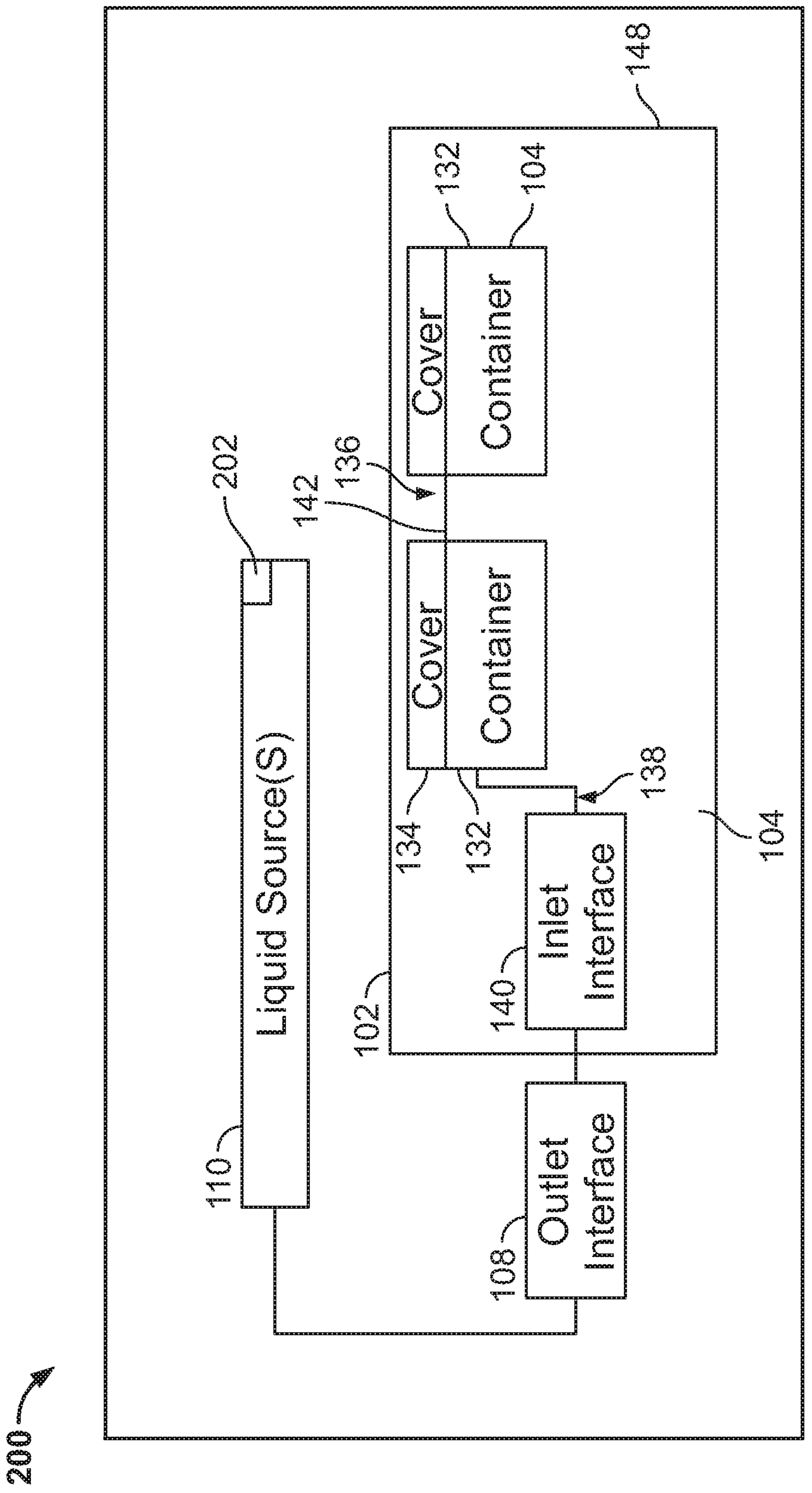
FIG. 2 illustrates a schematic diagram of an implementation of another system in accordance with the teachings of this disclosure.

FIG. 2 illustrates a schematic diagram of an implementation of another system 200 in accordance with the teachings of this disclosure. The system 200 of FIG. 2 includes the outlet interface 108 and the liquid source 110 containing a liquid 202 and is fluidically coupled to the outlet interface 108. The container assembly 102 is shown including the inlet interface 140 coupled to the outlet interface 108 of the system 100. The container assembly 102 includes the containers 104 having the distal ends 132 and the covers 134 that are coupled to the distal ends 132 of the respective containers 104. As with the container assembly 102 of FIG. 1, the container assembly 102 of FIG. 2 includes the framework 136 integral with: 1) the containers 104, 2) the covers 134, or 3) both. The framework 136 couples the containers 104 together and defines the fluidic network 138 including the inlet interface 140 and the fluidic channels 142 that fluidically couple the inlet interface 140 and the respective containers 104. In operation, the system 100 fills the containers 104 with the liquid in series or in parallel.

Figure 3:
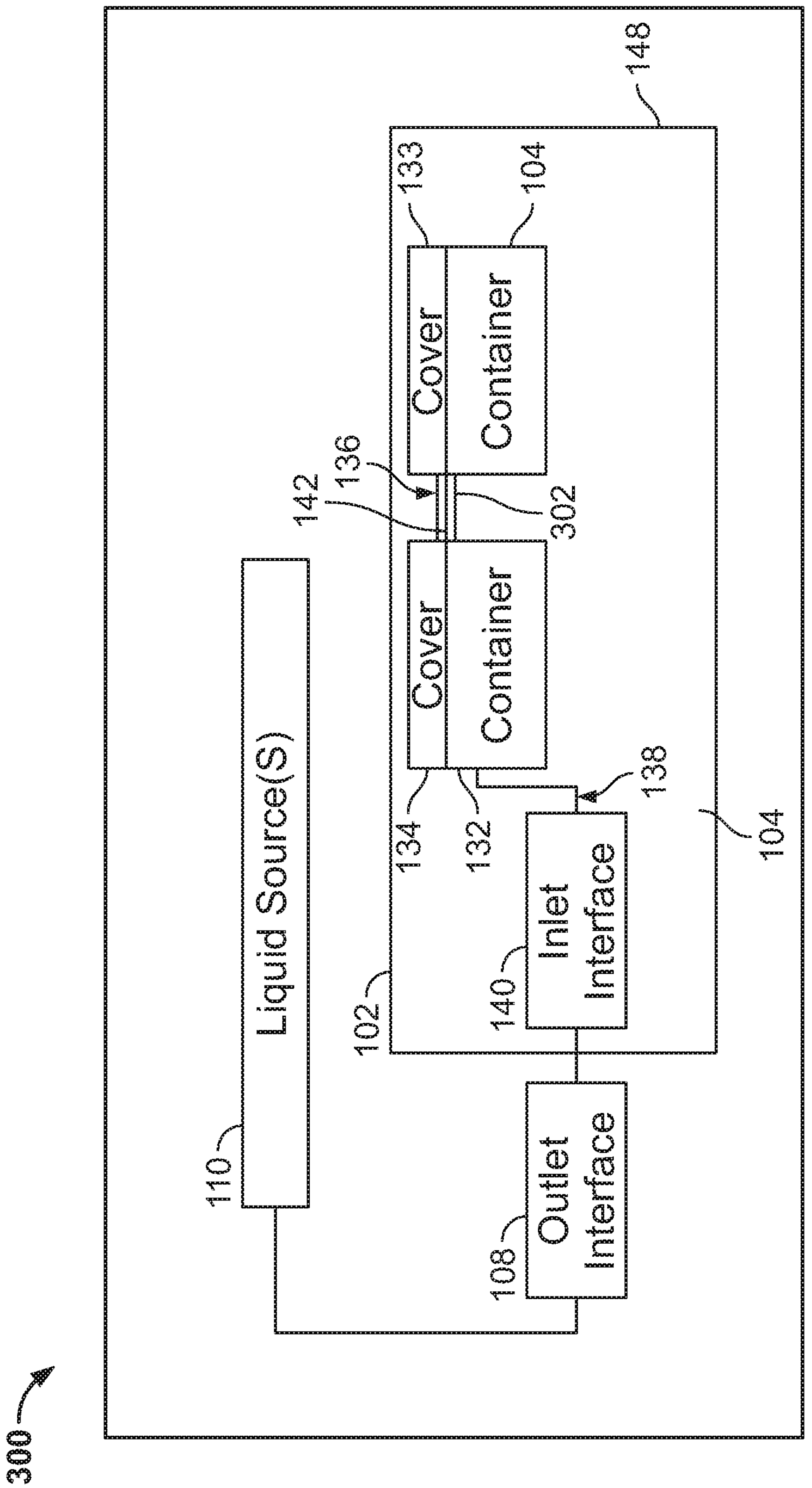
FIG. 3 illustrates a schematic diagram of an implementation of another system in accordance with the teachings of this disclosure.

FIG. 3 illustrates a schematic diagram of an implementation of another system 300 in accordance with the teachings of this disclosure. The system 100 includes the outlet interface 108 and the liquid source 110 fluidically coupled to the outlet interface 108. The container assembly 102 is shown including the inlet interface 140 that is coupled to the outlet interface 108 of the system 100. The container assembly 102 includes the containers 104 having the openings 133 and the covers 134 that are coupled to the containers 104 and extend across the openings 133. The container assembly 102 of FIG. 3 also includes the fluidic network 138 that includes the inlet interface 140 and the fluidic channels 142 that fluidically couple the inlet interface 140 and the respective containers 104. In the implementation shown, the container assembly 102 also includes one or more frangible tabs 302 that couple the respective containers 104 together and at least partially define the fluidic channels 142. The frangible tabs 302 may include one or more indentations or lines of weakness to enable the containers 104 to be separated from one another relatively easily. In operation, the system 100 fills the containers 104 with a liquid from the liquid source 110 by flowing the liquid from the liquid source 110, through the fluidic channels 142, and into the respective containers 104.

Figure 4A:
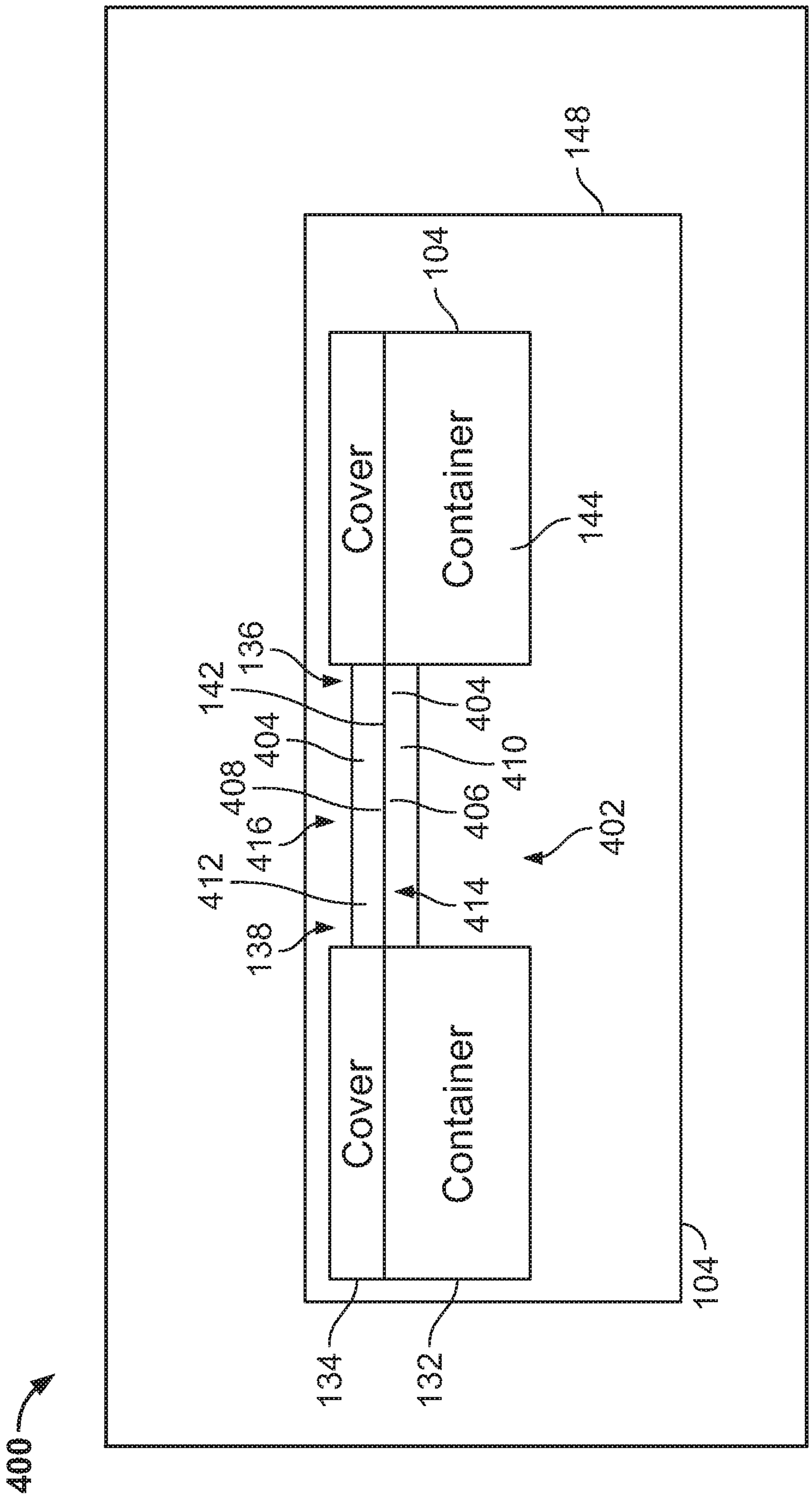
FIG. 4A illustrates a schematic diagram of an implementation of a container assembly that can be used to implement the container assemblies of FIGS. 1-3.

FIG. 4A illustrates a schematic diagram of an implementation of a container assembly 400 that can be used to implement the container assemblies 102, 103 of FIGS. 1-3. In the implementation shown, the container assembly 400 includes a container array 402 including the containers 104 having the distal ends 132 and the covers 134 that are coupled to the respective distal ends 132 of the containers 104. The container array 402 may include a 100×100 array of the containers 104, a 10×10 array of the containers, or a 1×10 array of the containers 104. However, any number of the containers 104 may be included (e.g., 10, 100, 400, 700, 1000, 2000, 3200, 5000, 10000).

The containers 104 may have any suitable geometries—e.g., vials, bottles, closable vessels, cartridges, syringe barrels, etc. having any size and/or cross-section (e.g., circular, oblong, rectangular) and/or include any material. For example, the internal cavity 144 of the containers 104 may be approximately 2 milliliters (ml), approximately 3 ml, approximately 4 ml, approximately 6 ml, approximately 10 ml, etc. and the containers 104 may include a chemically inert material such as glass and/or thermoplastic. The glass may be borosilicate type 1 glass. However, other types of glass may be suitable. The thermoplastic may be a cyclic olefin copolymer (COC). However, other types of thermoplastics may be suitable. When the containers 104 are formed as cartridges, the cartridges may be used in association with automatic injection devices such an autoinjector or an on-body injector. In such implementations, the containers 104 may be pressurized post filling for auto-injection and a top portion of the containers 104 may include an injection portion attached (e.g., pre-attached) instead of or in addition to including a septum. In other implementations in which the containers 104 are used with auto-injectors, the containers 104 may not be pressurized, the container 104 may be formed as a barrel of a syringe, and the contents of the containers 104 may be dispensed by actuating a piston within the container 104. The piston may be actuated using a spring of the auto-injector. However, the piston may be actuated in different ways to dispense the contents of the container 104. Regardless of the form and/or the size of the containers 104, the containers 104 may satisfy standards set by the International Organization for Standardization (ISO), the Current Good Manufacturing Practice (CGMP) requirement standards, and/or guidance provided by The United States Food and Drug Administration (FDA).

Referring still to the container assembly 400 of FIG. 4A, the container assembly 400 includes the framework 136 that is integral with the containers 104 and/or the covers 134 and that couples the containers 104 together. The container assembly 400 includes the fluidic network 138 having the fluidic channels 142 that are defined by the framework 136 and that enable the containers 104 to be filled in series or in parallel. The framework 136 includes flanges 404 that couple adjacent ones of the containers 104 together. The flanges 404 may be formed by layers 406, 408 between which the fluidic channels 142 are defined. The flanges 404 may be tabs that are radially spaced from one another (see, FIG. 7). However, the flanges 404 may be differently formed and/or the containers 104 can be coupled in any suitable way.

In some implementations, the first layer 406 is integral with the containers 104 and forms container flanges 410 that radially extend from the containers 104 and the second layer 408 is integral with the covers 134 and forms cover flanges 412 that radial extend from the covers 134. As such, the containers 104 and the container flanges 410 form a container framework 414 integral with and coupling the containers 104 together and the covers 134 and the cover flanges 412 form a cover framework 416 integral with and coupling the covers 134 together. The container framework 414 may form a first lattice arrangement and the cover framework 416 may form a second lattice arrangement.

While the above example mentions the first layer 406 being integral with the containers 104 and the second layer 408 being integral with the covers 134, both of the layers 406, 408 may be integral with the containers 104 or both of the layers 406, 408 may be integral with the covers 134. When both of the layers 406, 408 are integral with the covers 134, the first layer 406 can be coupled to the distal ends 132 of the containers 104 via, for example, thermal bonding or a snap-fit connection. Such an approach of having the covers 134 define the fluidic channels 142 between the containers 104 and having the covers 134 couple the containers 104 together enables the containers 104 to be made of materials such as glass that more easily satisfy guidance provided by regulatory agencies (e.g., ISO, CGMP, FDA).

Figure 4B:
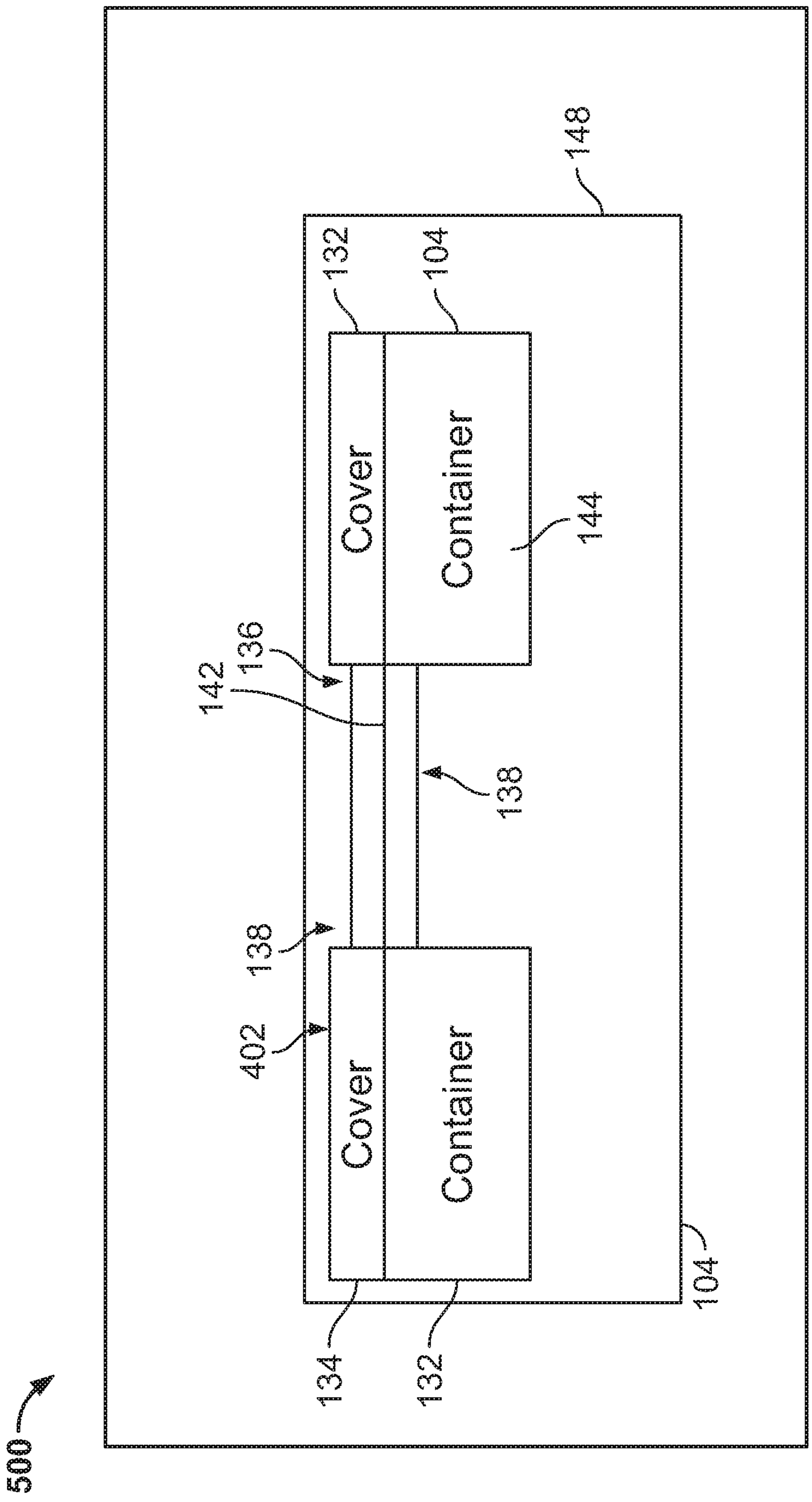
FIG. 4B illustrates a schematic diagram of an implementation of a container assembly that can be used to implement the container assemblies of FIGS. 1-4A.

FIG. 4B illustrates a schematic diagram of an implementation of a container assembly 500 that can be used to implement the container assemblies 102, 103, 400 of FIGS. 1-4A. In the implementation shown, the container assembly 500 includes the container array 402 including the containers 104 having the distal ends 148 and the covers 134 that are coupled to the respective distal ends 132 of the containers 104. The container assembly 500 also includes the framework 136 integral with the containers 104 and/or the covers 134 and that couples the containers 104 together. The container assembly 500 includes the fluidic network 138 including the fluidic channels 142 that are defined by the framework 136 and enable the containers 104 to be filled in series or in parallel.

Figure 5:
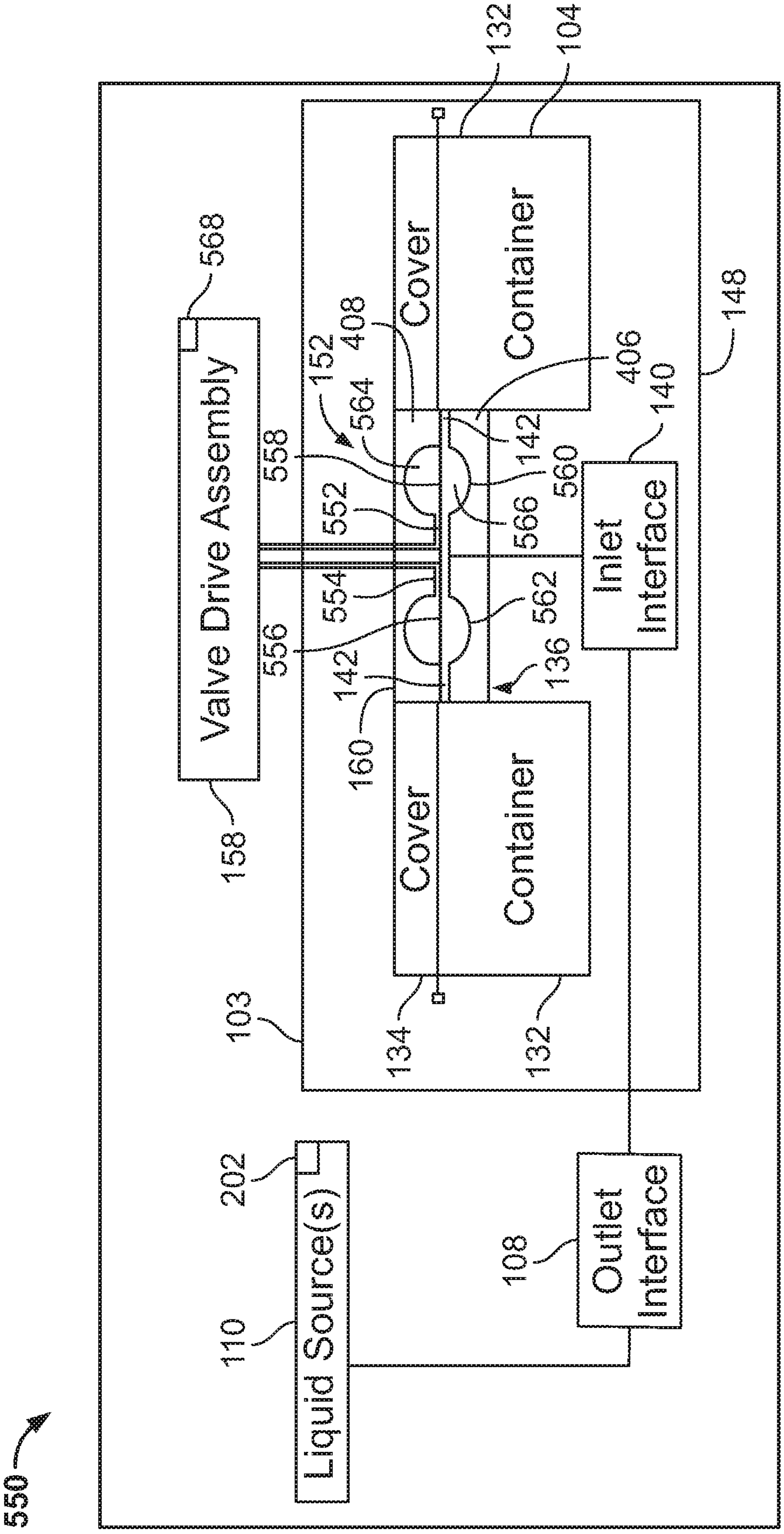
FIG. 5 illustrates a schematic diagram of an implementation of a container assembly that can be used to implement the container assemblies of FIGS. 1-4A and 4B.

FIG. 5 illustrates a schematic diagram of an implementation of a container assembly 550 that can be used to implement the container assemblies 102, 103, 400 of FIGS. 1-4A and 4B. In the implementation shown, the framework 136 includes the layers 406, 408 and an elastomer 552 positioned between the layers 406, 408. Lower fluidic channels 142 are defined between the lower layer 406 and the elastomer 552 and upper fluidic channels 554 are defined between the elastomer 552 and the upper layer 406. The lower fluidic channels 142 may be used to flow the liquid into the containers 104 during the filling process and the upper fluidic channels 554 may be used to flow a process fluid (e.g., a gas, a control pressure) that actuates the valves 152 as further disclosed below.

The framework 136 also includes the valves 152 with a corresponding portion 556 of the elastomer 552 being a fluid control member 558 and a surface 560 of the lower layer 406 that opposes the fluid control member 558 being a valve seat 562. The fluid control member 558 is shiftable between an open position in which the fluid control member 558 is spaced from the valve seat 562 allowing liquid to flow from the liquid source 110, through the lower fluidic channel(s) 142 and into the container 104 and a closed position in which the fluid control member 558 is urged against the valve seat 562 to deter the liquid from flowing into the corresponding container 104.

In the implementation shown, the layers 406, 406 define opposing chambers 564, 566 that are separated by the elastomer 552. The upper chambers 564 are fluidically coupled to a pressure source 568 of the valve drive assembly 158 and the lower chambers 566 are fluidically coupled to the inlet interface 140 and the corresponding container 104. The upper chamber 564 can be a dead ended fluidic chamber having a known volume that captures gas from the pressure source 568 and creates a positive pressure source that can be used to urge the fluid control member 558 into engagement with the valve seat 562. The upper chamber 564 being dead ended also enables the pressure source 568 to draw the gas from the upper chamber 564 and create a negative pressure source that can be used to urge the fluid control member 558 to move away from the valve seat 562. Thus, in one implementation, the upper chamber 564 is dead ended to enable the pressure within the upper chamber 564 to decrease. And, in another implementation, the upper chamber 564 is dead ended to enable the pressure within the upper chamber 564 to increase.

In operation, the valve drive assembly 158 changes a pressure within the upper chambers 564 to correspondingly move the fluid control member 558 relative to the valve seat 562. For example, when the valve drive assembly 158 creates a negative pressure within the upper chamber(s) 564 that is a lower pressure than a pressure within the lower fluidic channel 142, the corresponding fluid control member 558 is moved away from the valve seat 562 and, when the valve drive assembly 158 creates a positive pressure within the upper chamber(s) 564 that is greater than a pressure within the lower fluidic channel 142, the corresponding fluid control member 558 is moved toward the valve seat 562. Thus, the valve drive assembly 158 can selectively control the pressure within one or more of the upper chambers 564 to independently control a position of the valves 152.

In one implementation, the pressure source 568 may actuate the valves 152 by providing a control pressure to the upper chambers 564 of between about 10 kilopascals (kPA) and about 70 kPa including 10 kPA itself and including 70 kPa itself. In some such implementations and to open the valves 152, the negative pressure (the opening pressure) within the upper chambers 564 may be about −60 kPa including −60 kPa itself and, to close the valves 152, the positive pressure (the closing pressure) within the upper chambers 564 may be about +60 kPa including +60 kPa itself. In this example, the pressure within the upper fluidic channel 554 may change approximately 120 kPa including 120 kPa itself when actuating the valve 152. However, other pressures may be used. While the chambers 564, 566 are shown being defined by curved surfaces (bowl-shaped surfaces) of the layers 406, 408, the chambers 564, 566 may be differently defined or omitted.

Figure 6:
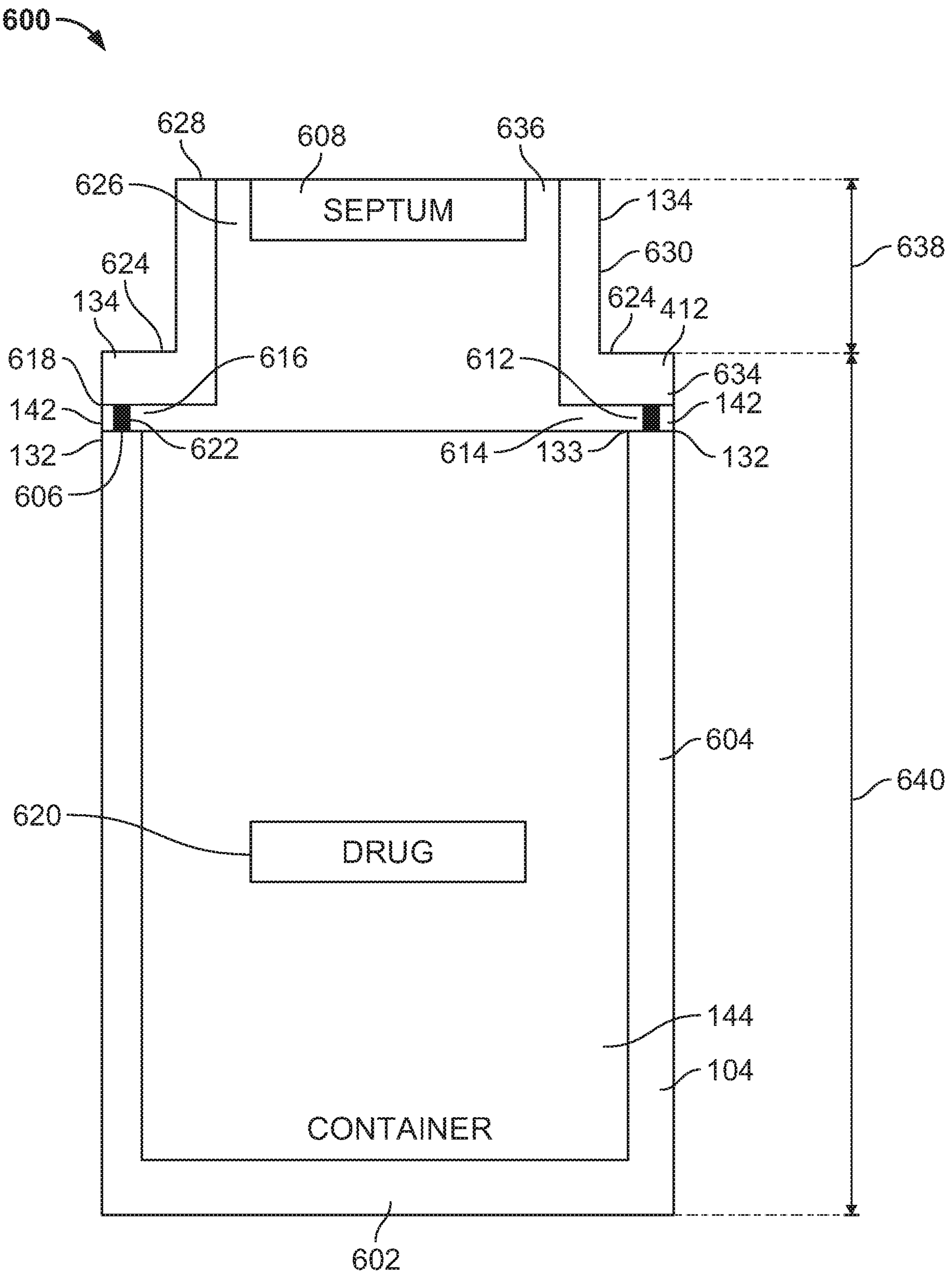
FIG. 6 illustrates a schematic diagram of an implementation of a container assembly that can be used to implement the container assemblies of FIGS. 1-5.

FIG. 6 illustrates a schematic diagram of an implementation of a container assembly 600 that can be used to implement the container assemblies 102, 103, 400, 500 of FIGS. 1-5. In the implementation shown, the container assembly 600 includes the container 104 that defines the cavity 144 and includes a base 602 and a side wall 604 that is coupled to the base 602 and defines the opening 133. The side wall 604 also includes a sealing surface 606 formed at the distal end 132 of the container 104 and that surrounds the opening 133. The container 104 may be a vial and may include glass and/or thermoplastic. However, the container 104 may include one or more other materials and/or may take any other form.

The container assembly 600 also includes the cover 134 that carries a septum 608 positioned over top of the opening 133 and includes the cover flange 412 that is coupled to the sealing surface 606 of the container 104 using adhesive, thermal bonding, plastic welding, or a mechanical connection. While the cover 134 is shown including the cover flange 412, in other implementations, the cover flange 412 may be omitted and the cover 134 may additionally or alternatively include a surface that matingly engages with the distal end 132 of the container 104. For example, the cover 134 may be formed as a collar and/or a cap that abuts the distal end 132 and couples the container 104 and/or the cover 134 together.

In the implementation shown, a pair of radially extending fluidic channels 142 are defined between the cover flange 412 and the sealing surface 606 of the container 104. A first fluidic channel 612 of the fluidic channels 142 includes an entrance 614 into the container 104 and a second fluidic channel 616 of the fluidic channels 142 includes a vent 618 out of the container 104. Advantageously, when the container 104 is filled with a drug 620, the drug 620 flows into the entrance 614 as gas contained within the cavity 144 flows out of the vent 618. When the containers 104 are filled in series, the fluidic channels 612, 616 may oppose one another and the vent 618 may also be used to flow the drug 620 to a subsequent container 104 once the previous container 104 is filled. When the containers 104 are filled in parallel, the fluidic channels 612, 616 may be orthogonal to one another such that the vents 618 are used to vent the gas from the cavity 144 but may not also be used to flow the drug 620 to a subsequent container 104.

The cavity 144 of the container 104 shown contains the drug 620 and each fluidic channel 142 has a sealed portion 622 that isolates the drug 620 within the container 104. The sealed portion 622 may be formed by exposing a surface 624 of the cover flange 412 to heat and/or a laser. However, the fluidic channels 142 may be sealed in different ways. Alternatively, the cavity 144 may not contain the drug 620 and/or the fluidic channels 142 may not be sealed.

Referring back to cover 134, in the implementation shown, the cover 134 defines a cover cavity 626 and has a cover top 628 and a cover side wall 630 extending from the cover top 628 and a cover interface 632 positioned at a distal end 634 of the cover 134. The cover cavity 626 defines a headspace 636 of the corresponding container 104. As a result of the headspace 636 provided, the cover 134 and the cover cavity 626 may be sized to allow the container 104 to be filled with the drug 620 up to about the fluidic channels 142 to allow for cascade filling while still enabling a threshold headspace to be achieved. A height 638 of the cover 134 and/or a height 640 of the container 104 can be changed to achieve the desired headspace 636.

Figure 7:
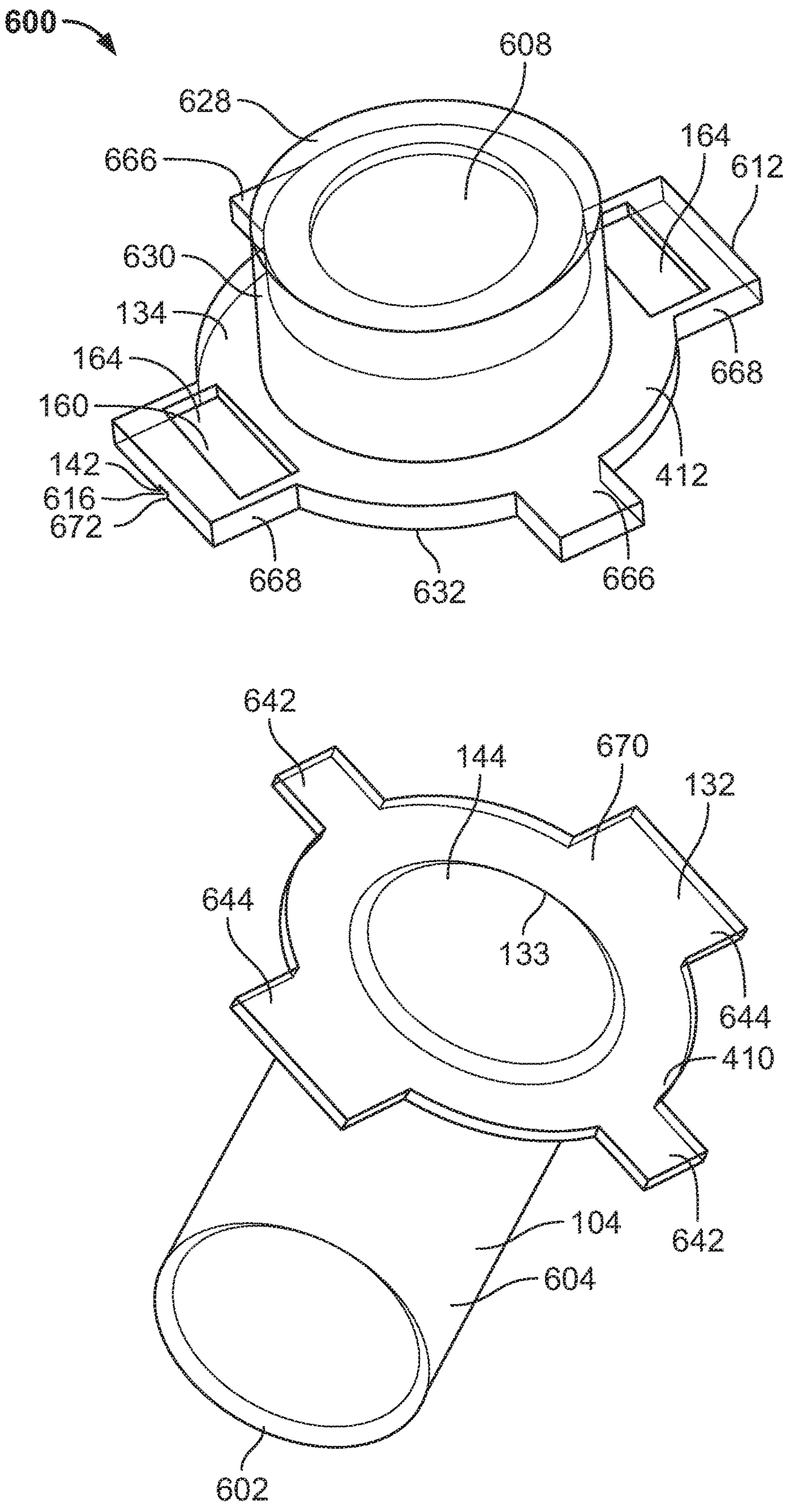
FIG. 7 illustrates an isometric expanded view of an implementation of the container assembly of FIG. 6.

FIG. 7 illustrates an isometric expanded view of an implementation of the container assembly 600 of FIG. 6. In the implementation shown, the container assembly 600 includes the container 104 having the container flange 410 from which container tabs 642, 644 extend and includes the cover 134 having the cover flange 412 from which cover tabs 666, 668 extend. The tabs 642, 644, 666, 668 are rectangular and radially extend from the flanges 410, 412, with the first tabs 642, 666 having a lesser width than the second tabs 644, 668 that define the fluidic channels 142 when the container 104 and the cover 134 are coupled. While the tabs 642, 644, 666, 668 are shown having a particular width, one or more of the tabs 642, 644, 666, 668 may have a similar width or a different width.

The distal end 132 of the container 104 has a flat surface 670 that the cover 134 engages against to define the fluidic channels 142 therebetween. To define the fluidic channels 142, the cover flange 412 and/or the cover tabs 644, 668 define grooves 672 that form a portion of the fluidic channels 142 and allow the fluidic channels 142 to be relatively easily sealed. For example, heat (e.g., a laser) can be applied within the recesses 164 positioned above the grooves 672 and defined by the cover tabs 668 to collapse the corresponding fluidic channel 142. While the grooves 672 are shown being defined by the second tabs 668 and not being defined by the first tabs 666, in other implementations, one of the second tabs 668 may define the groove 672 and both of the first tabs 666 may define the grooves 666. Such an approach of providing the first tabs 666 with the grooves 672 may be advantageous to allow the grooves 672 of the first tabs 666 to act as a vent and for the groove 672 of the second tabs 668 to act as the entrance 614 to the cavity 144. Moreover, one or more of the tabs 642, 644 may include a corresponding groove 672.

Figure 8:
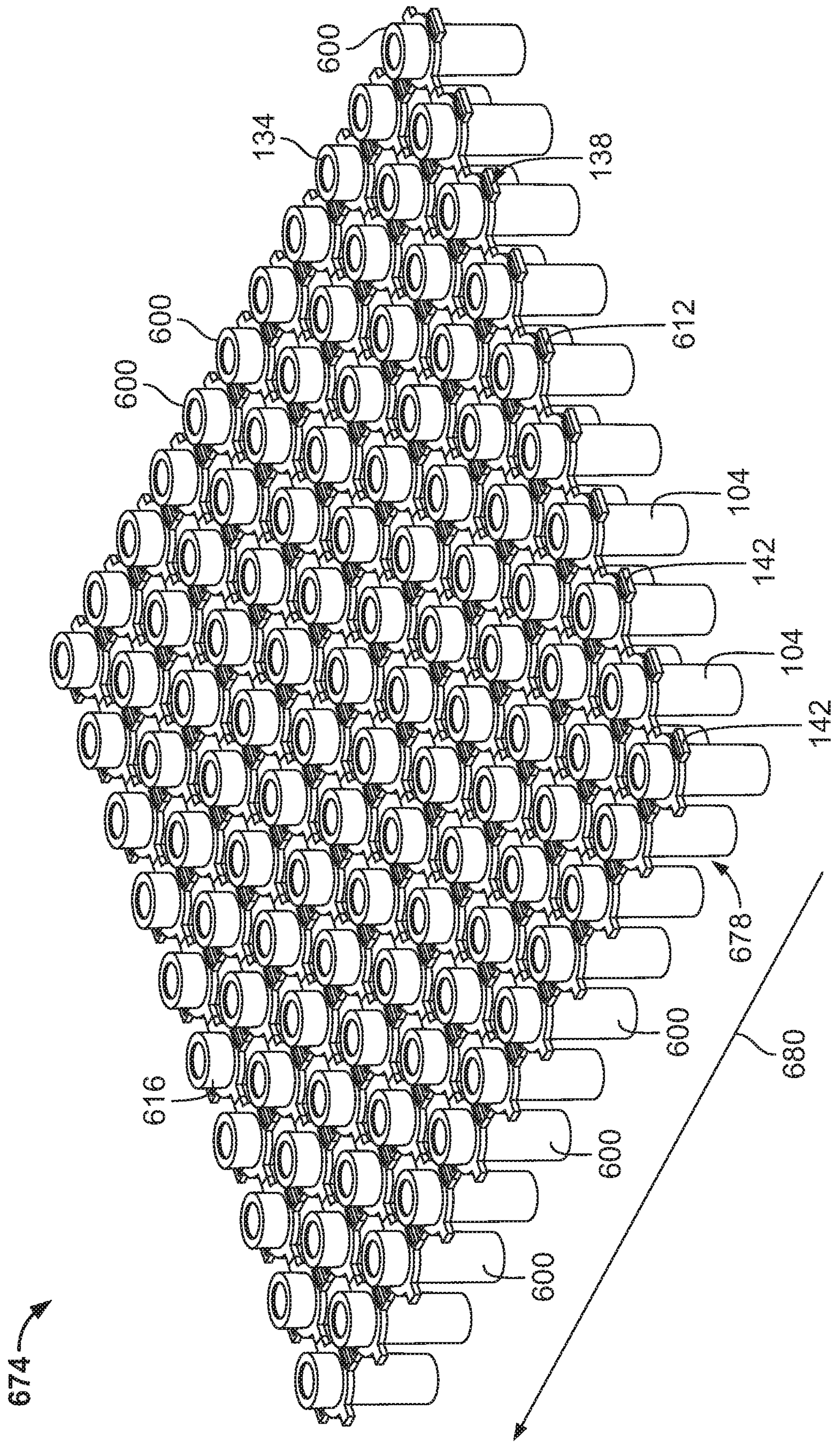
FIG. 8 illustrates an example container array of the container assemblies of FIG. 6 that are arranged to fill the corresponding containers in series.

FIG. 8 illustrates a container array 674 of the container assemblies 600 of FIG. 6 that are arranged to fill the corresponding containers 104 in series. The container array 674 may also be used to fill the container assemblies 600 in parallel when, for example, the framework 136 includes the fluidic channels 142 and the valves 152 (see, the container assembly 103 of FIG. 1). In the implementation shown, the container array 674 is a 10×10 array of the containers 104. However, the container array 674 may include any size array (e.g., 2x5, 100×100, 200×200, 500×500). To fill the containers 104, the container array 674 is fluidically coupled to the outlet interface 108 of the system 100 and the system 100 flows the liquid into the fluidic network 138 and the fluidic channels 142 of a first row 678 of the containers 104. As the liquid flows into the containers 104, gas contained within those containers 104 vents into the subsequent containers 104 in a direction generally indicated by arrow 680. After the containers 104 within the first row 678 are filled with the liquid, the liquid flows into the subsequent containers 104 in the direction generally indicated by arrow 680 until all of the containers 104 of the array 674 are filled with a threshold amount of the liquid.

Figure 9:
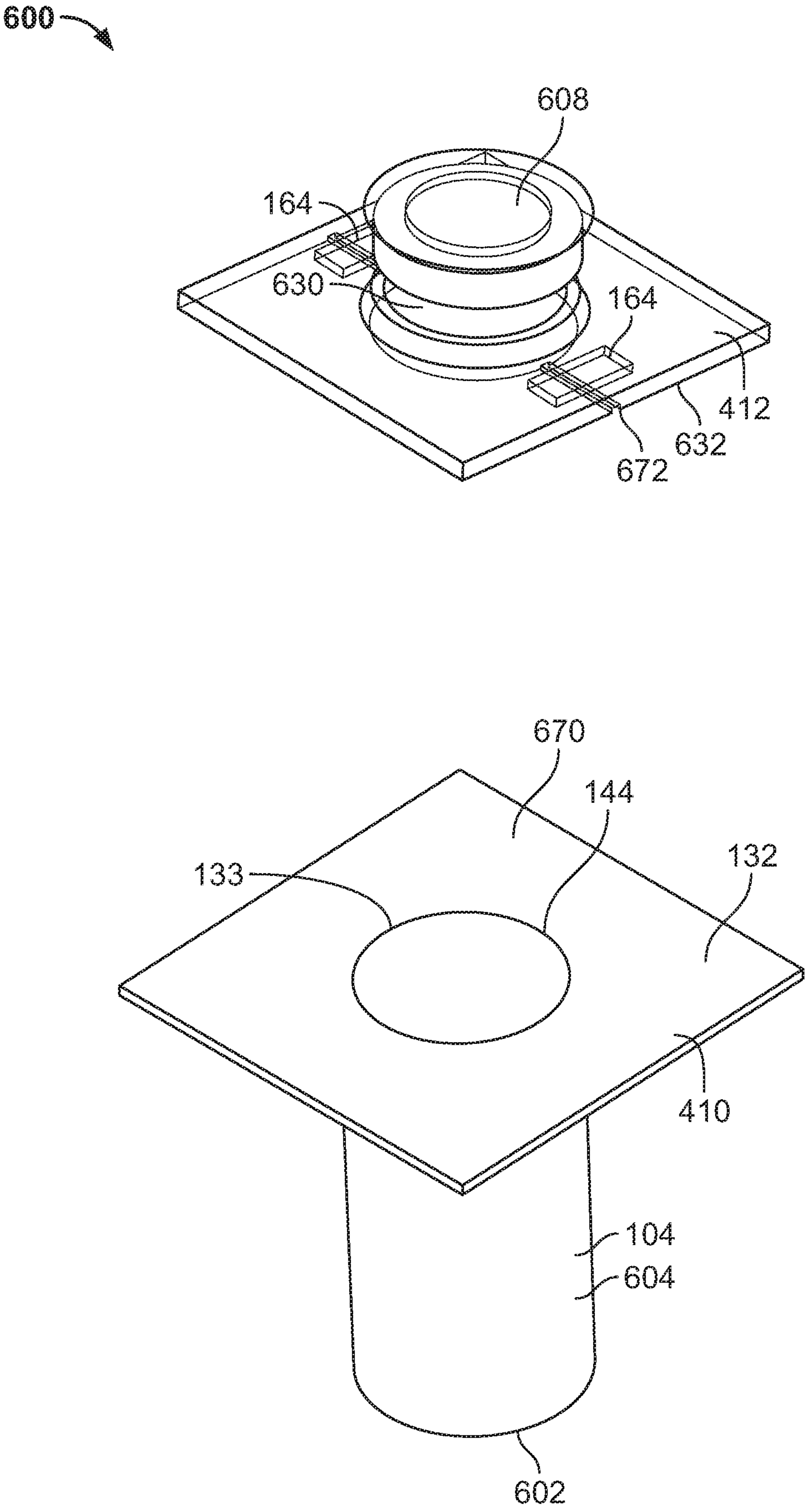
FIG. 9 illustrates an isometric expanded view of another implementation of the container assembly of FIG. 6.

FIG. 9 illustrates an isometric expanded view of another implementation of the container assembly 600 of FIG. 6. The container assembly 600 of FIG. 9 is similar to the container assembly 600 of FIG. 7. However, in contrast, the container flange 410 and the cover flange 412 of the container assembly 600 of FIG. 9 are rectangular and the tabs 642, 644, 666, 668 are omitted. While the flanges 410, 412 of FIG. 9 are shown in a particular way, the flanges 410, 412 may be differently formed. For example, the flanges 410, 412 can include notches to facilitate the containers 104 being separated once the container assemblies 600 are filled with the liquid.

Figure 10:
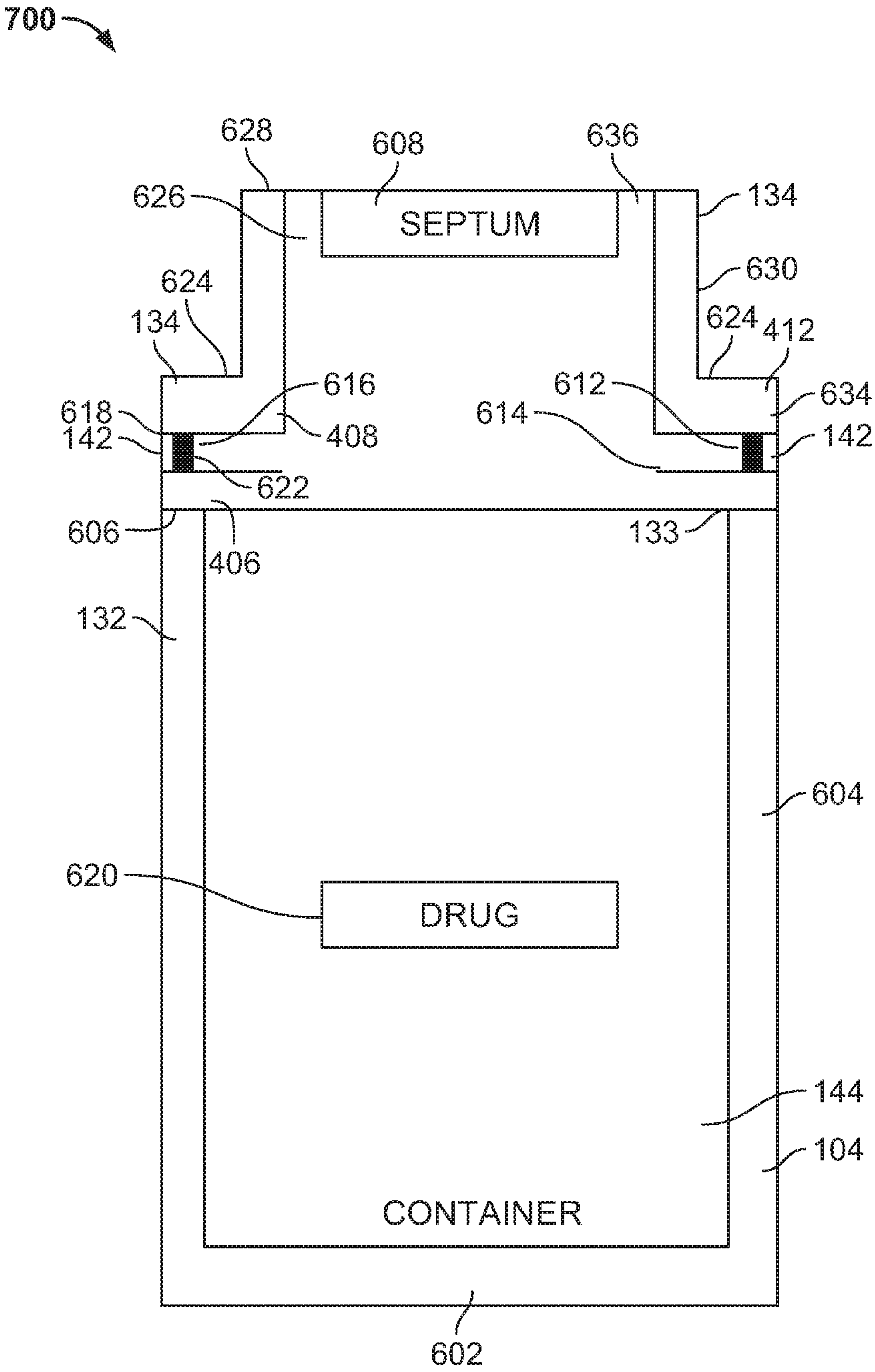
FIG. 10 illustrates a schematic diagram of an implementation of another container assembly that can be used to implement the container assemblies of FIGS. 1-5 and/or the container array of FIG. 8.

FIG. 10 illustrates a schematic diagram of an implementation of another container assembly 700 that can be used to implement the container assemblies 102, 103, 400, 500 of FIGS. 1-5 and/or the container array 674 of FIG. 8. The container assembly 700 of FIG. 10 is similar to the container assembly 600 of FIG. 6. However, in contrast, the cover 134 of the container assembly 700 of FIG. 10 defines the pair of the radially extending fluidic channels 612, 616. Thus, the cover 134 includes the layers 406, 408 that define the fluidic channels 612, 616 therebetween. While the vent 618 of the fluidic channel 612 is shown opposing the entrance 614 of the other fluidic channel 616 and the fluidic channels 612, 616 may be arranged for filling an array of the containers 104 in series, the vent 618 and the entrance 614 may be differently arranged and/or three fluidic channels 142 may be included when, for example, the container assembly 700 is to be filled in parallel. In such an arrangement, one of the fluidic channels 142 can be used to fill the container 104 with the liquid and the other two fluidic channels 142 can be used to vent the gas from the containers 104 in series during the filling process.

Figure 11:
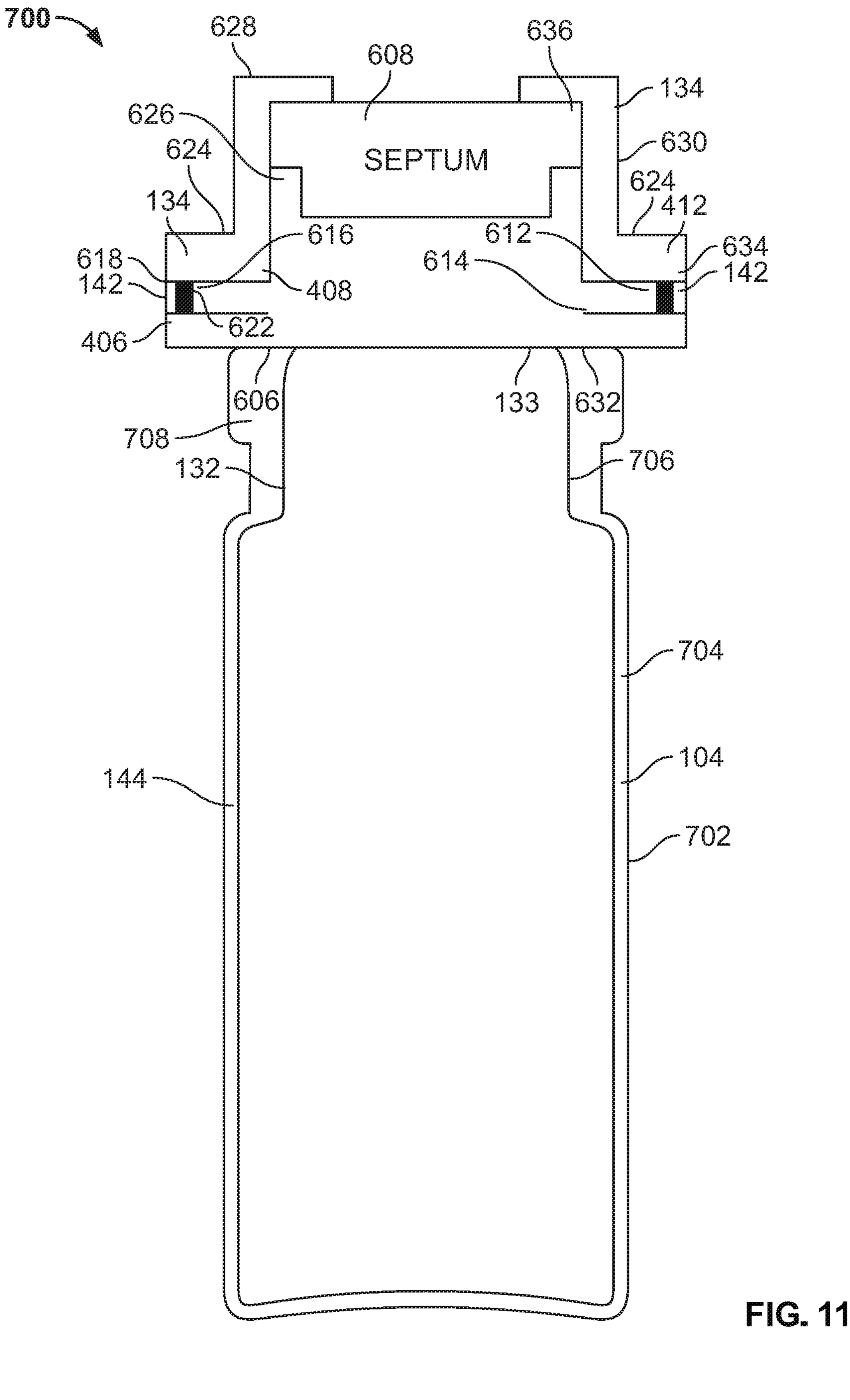
FIG. 11 illustrates an example of the container assembly of FIG. 10.

FIG. 11 illustrates an example implementation of the container assembly 700 of FIG. 10. In the implementation shown, the container 104 is a vial 702 including a body 704, a neck 706, and a flange 708 that defines the opening 133 into the cavity 144 of the vial 702. The cover 134 may be coupled to the distal end 132 in any suitable way including, for example, adhesive, a thermal coupling, etc.

Figure 12A:
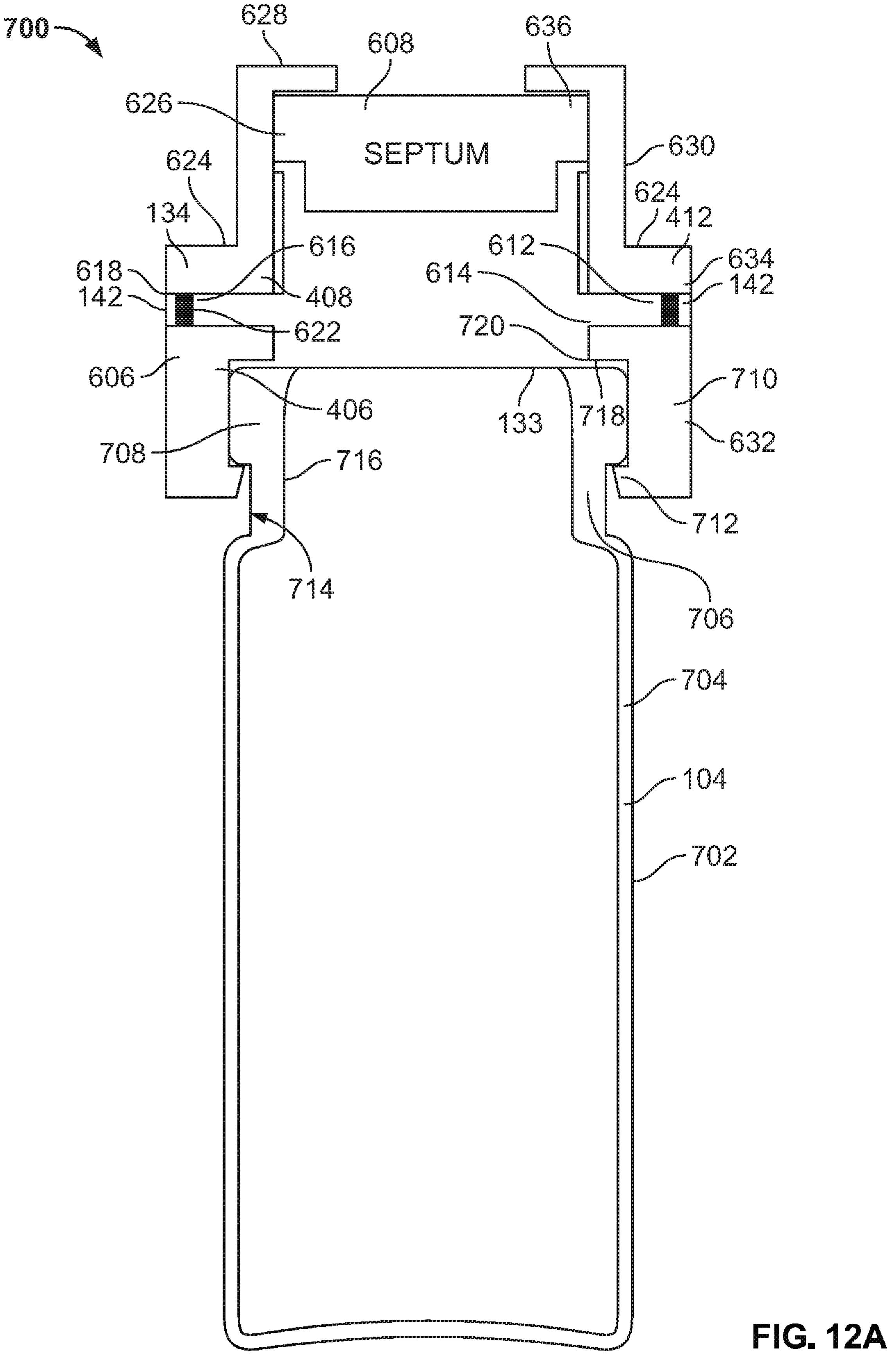
FIG. 12A illustrates an example of the container assembly of FIG. 10.
Figure 12B:
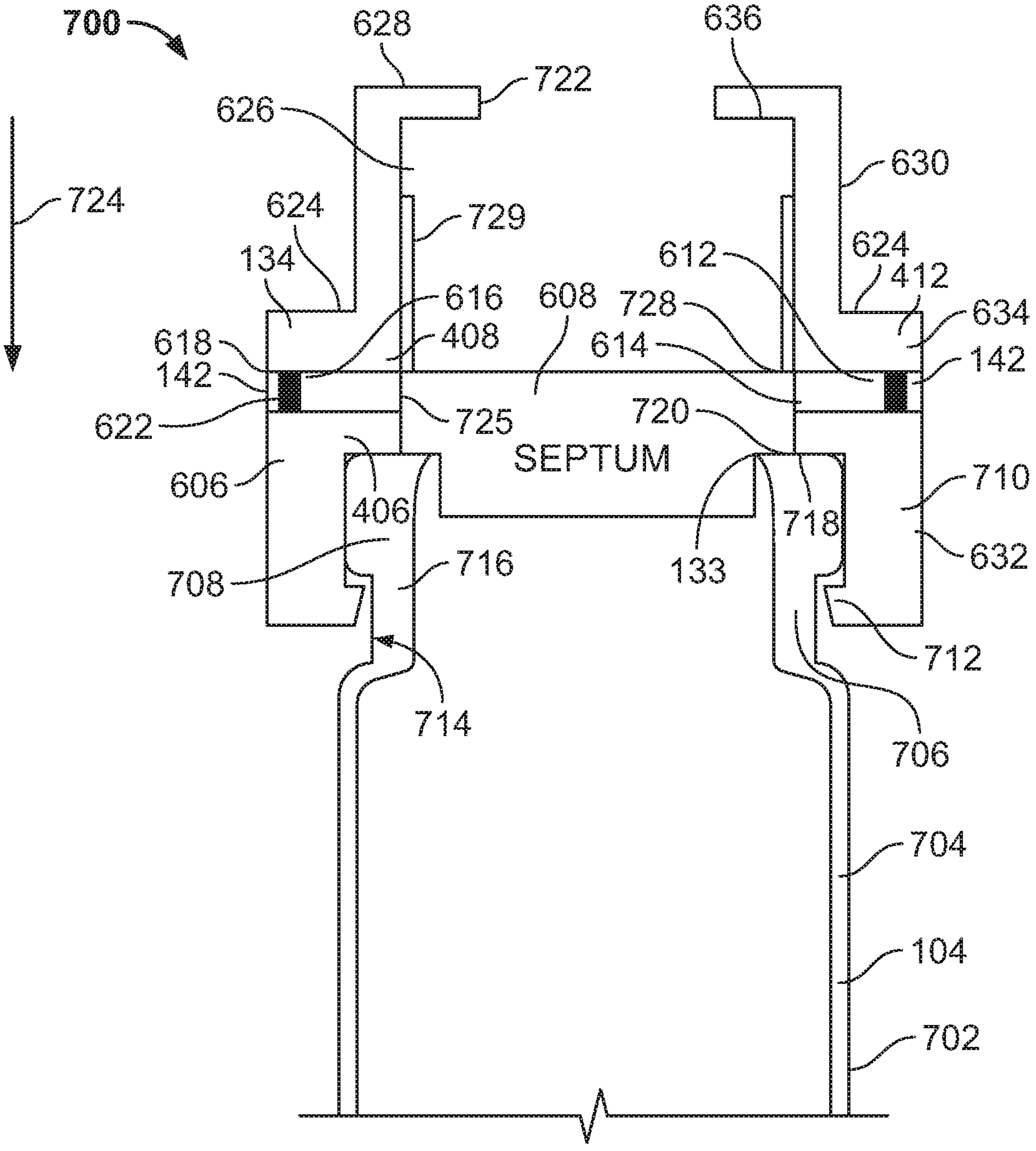
FIG. 12B illustrates the container assembly of FIG. 12A with a septum inserted into an opening of the corresponding container.

FIG. 12A illustrates an example implementation of the container assembly 700 of FIG. 10. In the implementation shown, the cover interface 632 of the cover 134 includes a collar 710 having an inward extending protrusion 712 that forms a snap-fit connection 714 with an external groove 716 of the vial 702. Thus, the snap-fit connection 714 is formed between the cover 134 and the distal end 132 of the container 104. The cover interface 632 also includes an inward extending step 718 having a surface 720 that abuts the distal end 132 of the vial 702. In some implementations, the fluidic channels 612, 616 have the sealed portions 622 that isolate the drug 620 within the container 104. Additionally or alternatively and as shown in FIGS. 12A and 12B, the septum 608 can be inserted into the opening 133 of the container 104 to seal the internal cavity 144. To do so, an actuator rod (not shown) of the sealer 126 may extend through an opening 722 of the cover 134 and engage and move the septum 608 in a direction generally indicated by arrow 724 to urge the septum 608 into the opening 133 of the container 104 and into a position in which sides 725 of the septum 608 seal the fluidic channels 612, 616. The cover 134 is shown including an inward extending protrusion 726 having a shoulder 728 that is positioned over top of the septum 608 to secure the septum 608 within the opening 133. The protrusion 726 may be a ramp to allow a snap-fit connection to be formed between the septum 608 and the protrusion 726.

FIGS. 13-18 illustrate flowcharts for methods of performing a filling operation and/or a sealing operation using the system 100 of FIG. 1 or any of the container assemblies 102, 103, 400, 500, 600, 700 disclosed herein. The order of execution of the blocks may be changed, and/or some of the blocks described may be changed, eliminated, combined and/or subdivided into multiple blocks.

Figure 13:
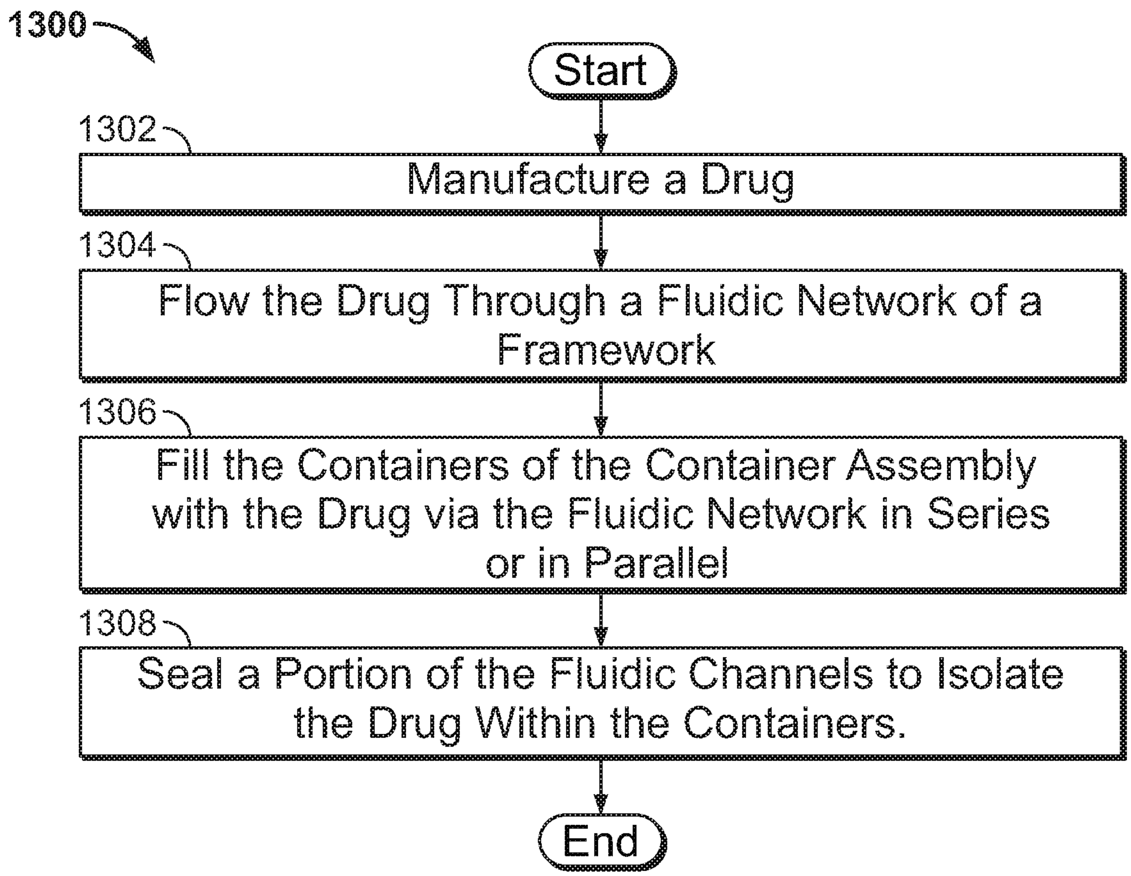
FIG. 13 illustrates a flowchart for an example method of performing a filling operation and/or a sealing operation using the system of FIG. 1 or any of the container assemblies disclosed herein.

The process 1300 of FIG. 13 begins with the drug 620 being manufactured (Block 1302). In some implementations, the liquid source 110 of the system 100 manufactures the drug 620 and stores the drug 620 in the liquid reservoir 112. The drug 620 is flowed through the fluidic network 138 of the framework 136 of the container assembly 102, 103, 400, 500, 600, 700 (Block 1304). The framework 136 is integral with: (1) the containers 104 of the container assembly 102, 103, 400, 500, 600, 700, (2) the covers 134 covering respective ends 132 of the containers 104, or (3) both. The containers 104 of the container assembly 102, 103, 400, 500, 600, 700 are filled with the drug 620 using the fluidic network 138 in series or in parallel (Block 1306).

In some implementations, filling the containers of the container assembly 102, 103, 400, 500, 600, 700 includes filling a 100×100 array of the containers 104. The framework 136 may include the layers 406, 408 that define the fluidic channels 142 of the fluidic network 138. In such implementations, filling the containers 104 of the container assembly 102, 103, 400, 500, 600, 700 includes flowing the drug 620 through the fluidic channels 142 that are defined between the layers 406, 408.

The containers 104 and/or the covers 134 may include one or more of the layers 406, 408. If the cover 134 includes the layers 406, 408, at least one of the layers 406, 408 can be thermally bonded to the ends 132 of the containers 104. In such implementations, filling the containers 104 of the container assembly 102, 103, 400, 500, 600, 700 includes flowing the drug 620 through the fluidic channels 142 of the cover 134. If the container 104 and the cover 134 include the layers 406, 408, filling the containers 104 of the container assembly 102, 103, 400, 500, 600, 700 includes flowing the drug 620 through the fluidic channels 142 defined between the containers 104 and the covers 134. To do so, the framework 136 of the container assembly 102, 103, 400, 500, 600, 700 may include the container framework 414 that is integral with and couples the containers 104 together and the framework 136 also includes the cover framework 416 that is integral with and couples the covers 134 together. The container framework 414 matingly engages the cover framework 416 to couple the container 104 and cover frameworks 414, 416 together and to define the fluidic channels 142 of the fluidic network 138. The portion 162 of the fluidic channels 142 are sealed to isolate the drug 620 within the containers 104 (Block 1308).

Figure 14:
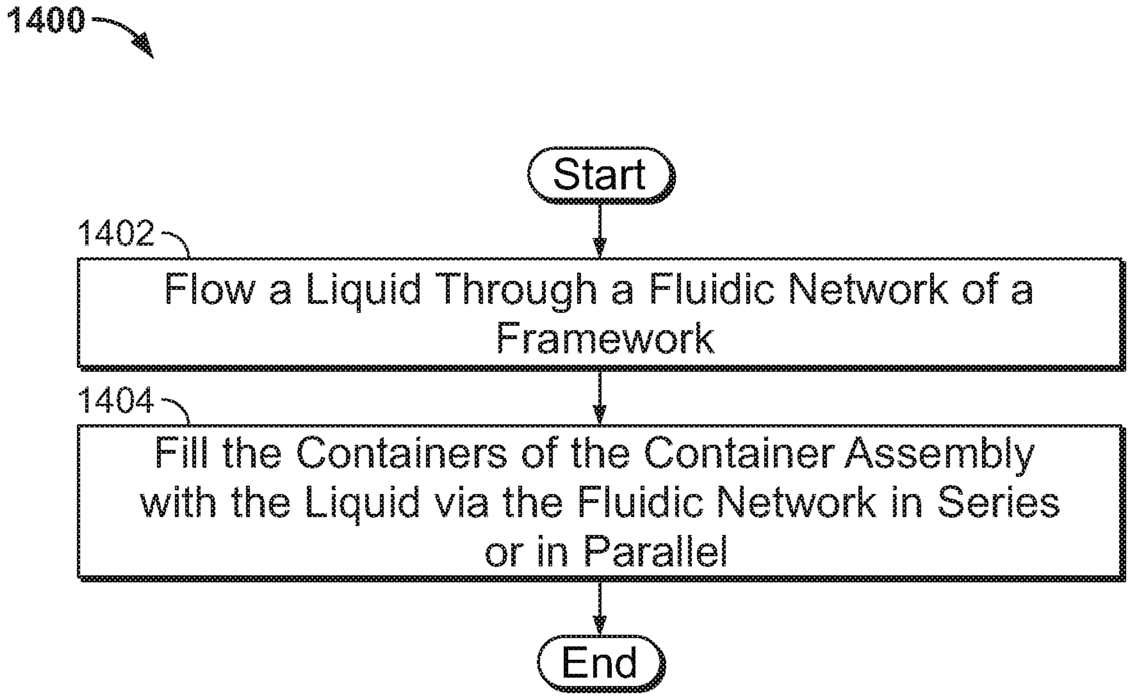
FIG. 14 illustrates a flowchart for an example method of performing a filling operation and/or a sealing operation using the system of FIG. 1 or any of the container assemblies disclosed herein.

The process 1400 of FIG. 14 begins with the liquid being flowed through the fluidic network 138 of the framework 136 of the container assembly 102, 103, 400, 500, 550, 600, 700 (Block 1402). The liquid may be the drug 620. The framework 136 is integral with: (1) the containers 104 of the container assembly 102, 103, 400, 500, 550, 600, 700, (2) the covers 134 covering respective ends 132 of the containers 104, or (3) both. The containers 104 of the container assembly 102, 103, 400, 500, 550, 600, 700 are filled with the liquid using the fluidic network 138 in series or in parallel (Block 1404).

Figure 15:
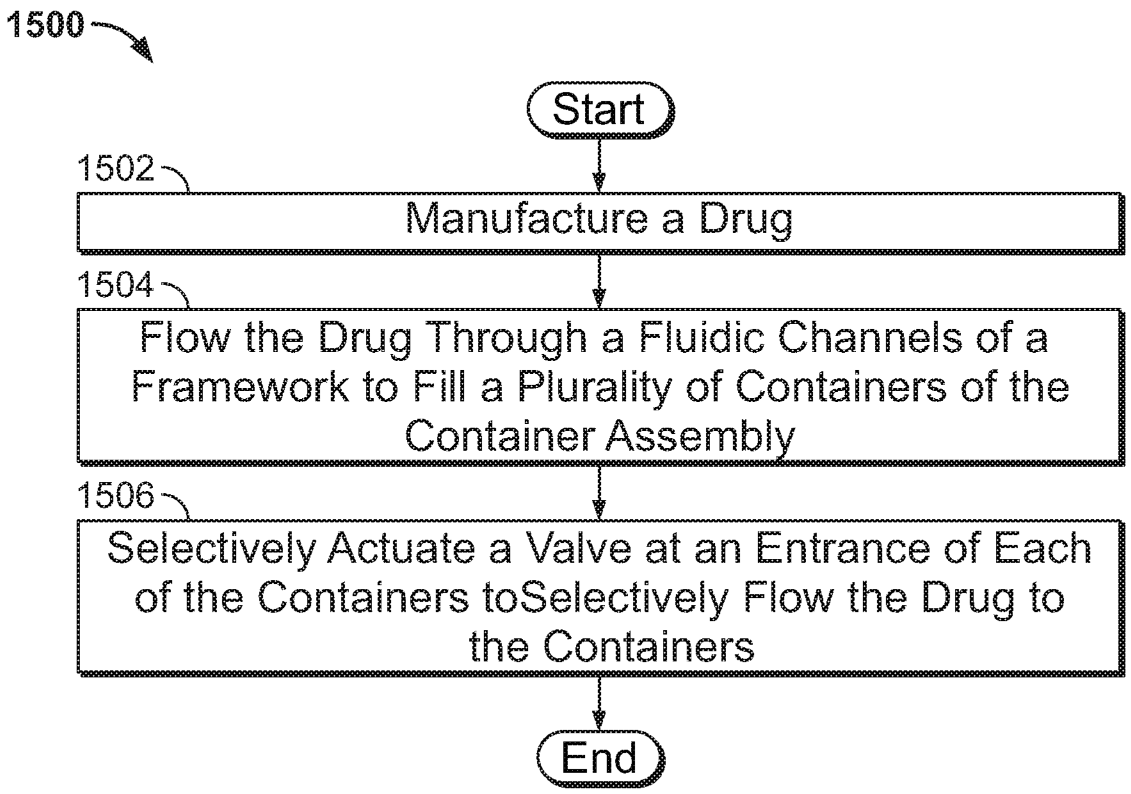
FIG. 15 illustrates a flowchart for an example method of performing a filling operation and/or a sealing operation using the system of FIG. 1 or any of the container assemblies disclosed herein.

The process 1500 of FIG. 15 begins with the drug 620 being manufactured (Block 1502). The drug 620 may be a vaccine. However, the drug 620 manufactured may be any other substance. The drug 620 is flowed through the fluidic channels 142 of the framework 136 to fill the containers 104 of the container assembly 102, 103, 400, 500, 550, 600, 700 (Block 1504). The framework 136 is integral with: (1) the containers 104, (2) the covers 134 that cover respective openings 133 of the containers 104, or (3) both. In some implementations, the containers 104 are vials 702 including glass, thermoplastic, and/or a cyclic olefin copolymer (COC). In such implementations, flowing the drug 620 through the fluidic channels 142 of the framework 136 to fill the containers 104 includes flowing the drug 620 through the fluidic channels 142 of the framework 136 to fill the vials 702. The containers 104 may be filled by cascade filling the containers 104 and/or filling the containers 104 in parallel. However, the containers 104 may be filled in different ways.

The fluidic channels 142 may include a main fluidic channel and branch fluidic channels that are coupled to the main fluidic channel. When the containers 104 are filled in series, the branch fluidic channels may be coupled between the respective containers 104 such that flowing the drug 620 through the fluidic channels 142 of the framework 136 includes flowing the drug 620 from the main fluidic channel to the branch fluidic channels to fill the containers 104 in series. Put another way, the branch fluidic channels may be positioned between the containers 104 such that the branch fluidic channels daisy-chain the containers 104 together. When the containers 104 are filled in parallel, the branch fluidic channels may be coupled to the respective containers 104 such that flowing the drug 620 through the fluidic channels 142 of the framework 136 includes flowing the drug 620 from the main fluidic channel to the branch fluidic channels to fill the containers 104.

In some implementations, flowing the drug 620 through fluidic channels 142 of the framework 136 includes selectively flowing the drug to the containers 104. To do so, the valves 150, 152 at the entrance 156 of each of the containers 104 are selectively actuated to selectively flow the drug to the containers 104 (Block 1506).

Figure 16:
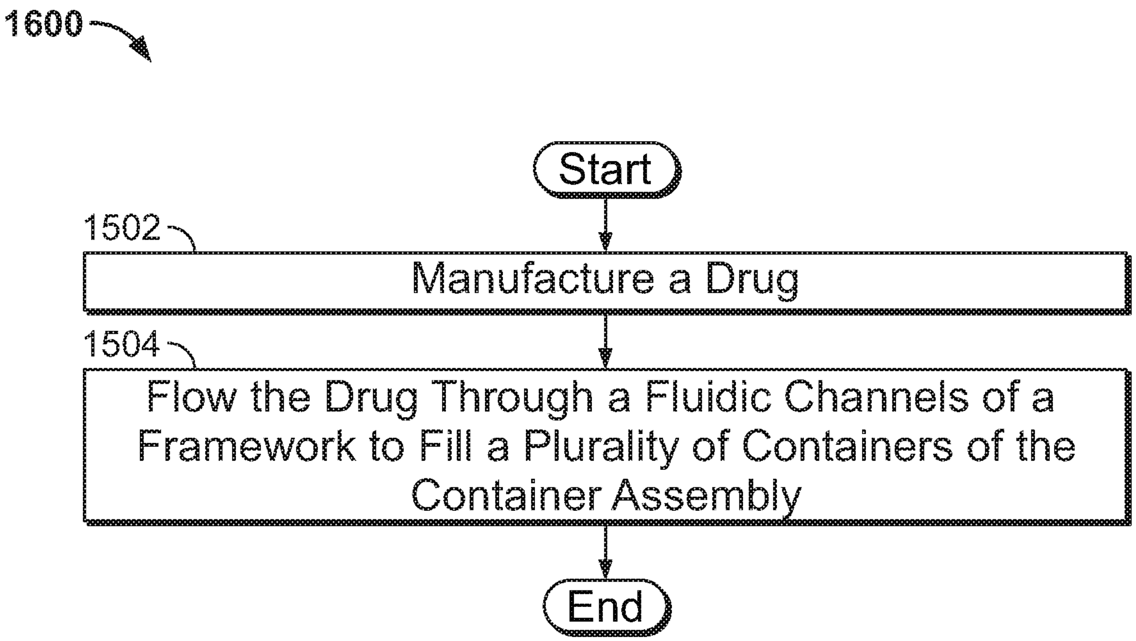
FIG. 16 illustrates a flowchart for an example method of performing a filling operation and/or a sealing operation using the system of FIG. 1 or any of the container assemblies disclosed herein.

The process 1600 of FIG. 16 begins with the drug 620 being manufactured (Block 1502). The drug 620 is flowed through the fluidic channels 142 of the framework 136 to fill the containers 104 of the container assembly 102, 103, 400, 500, 550, 600, 700 (Block 1504). The framework 136 is integral with: (1) the containers 104, (2) the covers 134 that cover respective openings 133 of the containers 104, or (3) both.

Figure 17:
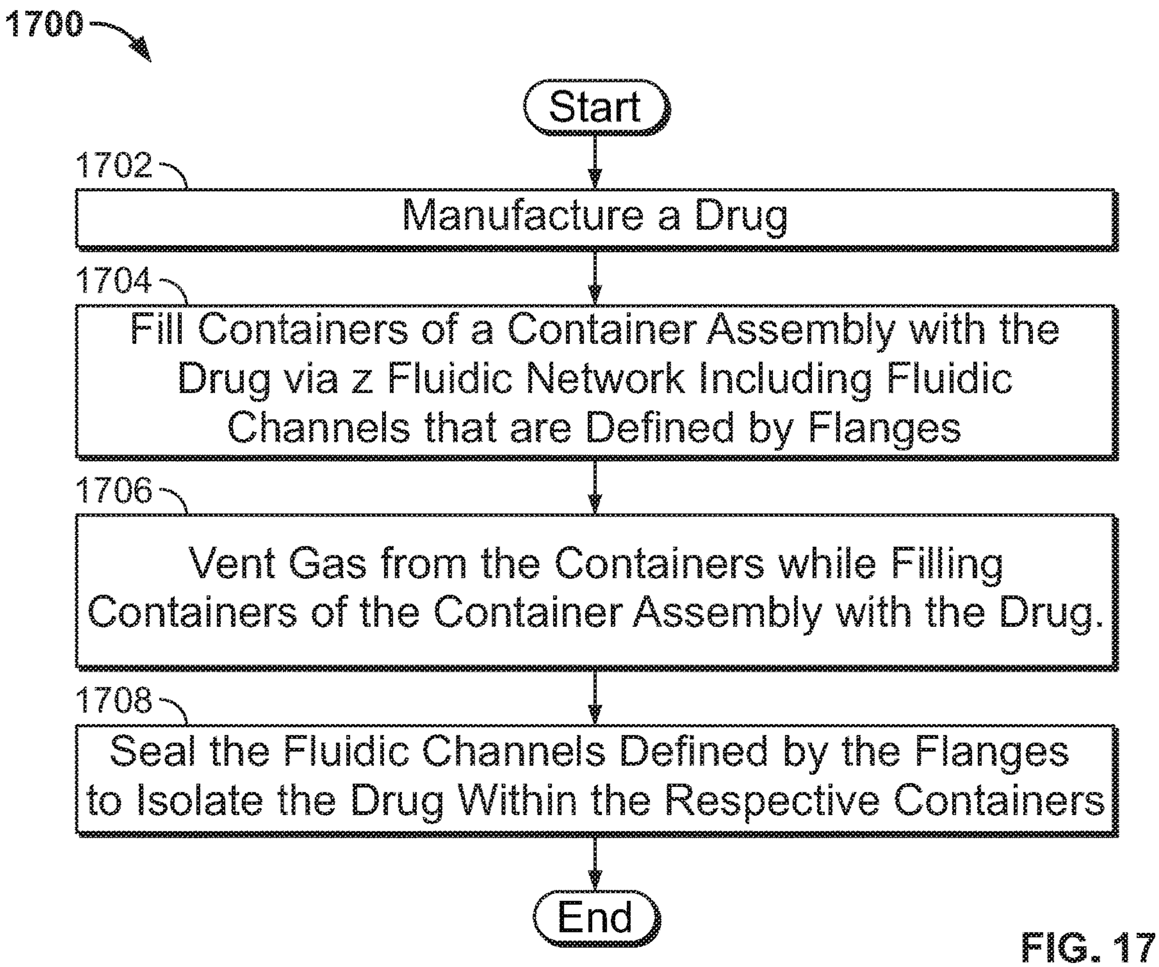
FIG. 17 illustrates a flowchart for an example method of performing a filling operation and/or a sealing operation using the system of FIG. 1 or any of the container assemblies disclosed herein.

The process 1700 of FIG. 17 begins with the drug 620 being manufactured (Block 1702). The drug 620 may be a vaccine. However, the drug 620 manufactured may be any other substance. The containers 104 of the container assembly 102, 103, 400, 500, 550, 600, 700 are filled with the drug 620 using the fluidic network 138 including the fluidic channels 142 that are defined by the flanges 302, 404, 644, 668 (Block 1704). The flanges 302, 404, 644, 668 are integral with: (1) the containers 104, (2) the covers 134 that cover the ends 132 of the respective containers 104, or (3) both. The containers 104 may be filled in series and/or in parallel.

Gas is vented from the containers 104 while the containers 104 are filled with the drug 620 (Block 1706). The gas may be vented from the containers 104 using one of the fluidic channels 142. The fluidic channels 142 that vent the gas may also be used to flow the drug 620 into the containers 104 when the containers 104 are filled in series or may be dedicated to venting the gas from the containers 104 (e.g., a pressure exit channel) when the containers 104 are filled in parallel.

The fluidic channels 142 defined by the flanges 302, 404, 644, 668 are sealed to isolate the drug 620 within the respective containers 104 (Block 1708). The fluidic channels 142 may be sealed by laser welding the closing area 160 of the flanges 302, 404, 644, 668 and/or by engaging the closing area 160 with a heating element. In some implementations, the drive assembly 128 moves heating elements into engagement with the closing areas 160 of the flanges 302, 404, 644, 668 of one or more of the containers 104 to close the sealed portion 622 of the fluidic channels 142.

Figure 18:
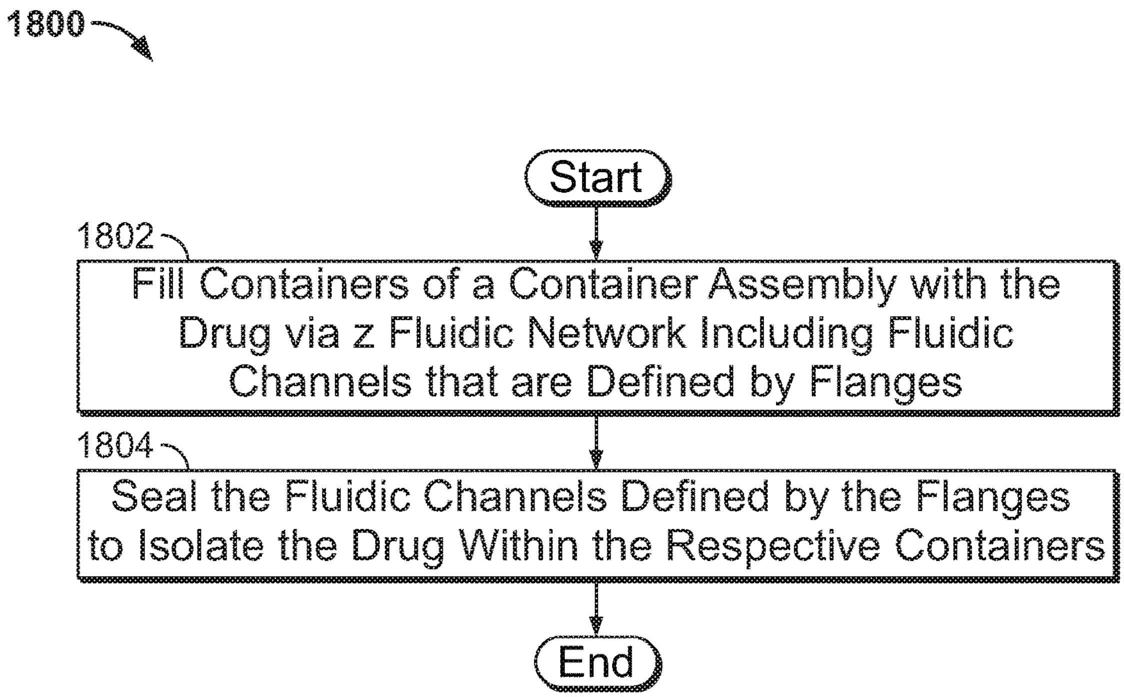
FIG. 18 illustrates a flowchart for an example method of performing a filling operation and/or a sealing operation using the system of FIG. 1 or any of the container assemblies disclosed herein.

The process 1800 of FIG. 18 begins with the containers 104 of the container assembly 102, 103, 400, 500, 550, 600, 700 being filled with the drug 620 using the fluidic network 138 including the fluidic channels 142 that are defined by the flanges 302, 404, 644, 668 (Block 1802). The flanges 302, 404, 644, 668 are integral with: (1) the containers 104, (2) the covers 134 that cover the ends 132 of the respective containers 104, or (3) both. The fluidic channels 142 that are defined by the flanges 302, 404, 644, 668 are sealed to isolate the drug 620 within the respective containers 104 (Block 1804).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including," having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. In one example, these terms include situation where there is no variation—0%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. A container assembly, comprising:

a container array comprising containers having distal ends;

covers coupled to the respective distal ends of the containers;

a framework integral with 1) the containers, 2) the covers, or 3) both, the framework coupling the containers together; and a fluidic network including fluidic channels that are defined by the framework and enable the containers to be filled in series or in parallel, wherein the framework includes the covers, and wherein each cover includes layers, between which one or more of the fluidic channels are defined, wherein the containers comprise container tabs and the covers comprise cover tabs, the cover tabs coupling pairs of the covers together.

2. The container assembly of claim 1, wherein the fluidic channels are at least partially defined between the container tabs and the cover tabs.

3. The container assembly of claim 1, wherein the container tabs and the corresponding containers collectively form a first lattice arrangement, and the cover tabs and the corresponding covers collectively form a second lattice arrangement.

4. The container assembly of claim 1, wherein each cover defines a cover cavity and has a cover top and a cover side wall extending from the cover top and including a cover interface at a distal end of the cover, and wherein the cover cavity defines a headspace for the corresponding container.

5. A container assembly, comprising:

a container array comprising containers having distal ends;

covers coupled to the respective distal ends of the containers;

a framework integral with 1) the containers, 2) the covers, or 3) both, the framework coupling the containers together; and a fluidic network including fluidic channels that are defined by the framework and enable the containers to be filled in series or in parallel, wherein the framework includes the covers, and wherein each cover includes layers, between which one or more of the fluidic channels are defined, wherein the framework includes tabs that couple pairs of the containers together, wherein each of the covers comprises layers and forms the tabs, and wherein the fluidic channels are defined between the layers.

6. The container assembly of claim 5, wherein one of the layers of each cover is coupled to the distal end of a corresponding container.

7. An apparatus, comprising:

a system comprising an outlet interface and a liquid source containing a liquid and fluidically coupled to the outlet interface; and a container assembly comprising:

containers having distal ends;

covers coupled to the distal ends of the respective containers; and a framework integral with: 1) the containers, 2) the covers, or 3) both, wherein the framework includes the covers, and wherein each cover includes layers, between which one or more fluidic channels are defined, wherein the framework couples the containers together and defines a fluidic network including an inlet interface coupled to the outlet interface and the fluidic channels that fluidically couple the inlet interface and the respective containers, and wherein the system is to fill the containers with the liquid in series or in parallel, wherein the system includes:

a staging area where the system is to stage the container assembly prior to the containers being filled with the liquid;

a sealing area where the system is to seal the containers and isolates the liquid within the respective containers; and a filling area where the system is to fill the containers and a mover that is to move the container assembly between the staging area and the filling area, and wherein the mover is further to move the container assembly between the filling area and the sealing area.

8. An apparatus, comprising:

a system comprising an outlet interface and a liquid source containing a liquid and fluidically coupled to the outlet interface; and a container assembly comprising:

containers having distal ends;

covers coupled to the distal ends of the respective containers; and a framework integral with: 1) the containers, 2) the covers, or 3) both, wherein the framework includes the covers, and wherein each cover includes layers, between which one or more fluidic channels are defined, wherein the framework couples the containers together and defines a fluidic network including an inlet interface coupled to the outlet interface and the fluidic channels that fluidically couple the inlet interface and the respective containers, and wherein the system is to fill the containers with the liquid in series or in parallel, wherein the system comprises a table-top system, wherein the liquid comprises a drug, and wherein the system manufactures the liquid.

9. The apparatus of 8, wherein the system includes:

a staging area where the system is to stage the container assembly prior to the containers being filled with the liquid;

a sealing area where the system is to seal the containers and isolates the liquid within the respective containers; and a filling area where the system is to fill the containers and a mover that is to move the container assembly between the staging area and the filling area, and wherein the mover is further to move the container assembly between the filling area and the sealing area.

10. An apparatus, comprising:

a system comprising an outlet interface and a liquid source containing a liquid and fluidically coupled to the outlet interface; and a container assembly comprising:

containers having distal ends;

covers coupled to the distal ends of the respective containers; and a framework integral with: 1) the containers, 2) the covers, or 3) both, wherein the framework includes the covers, and wherein each cover includes layers, between which one or more fluidic channels are defined, wherein the framework couples the containers together and defines a fluidic network including an inlet interface coupled to the outlet interface and the fluidic channels that fluidically couple the inlet interface and the respective containers, and wherein the system is to fill the containers with the liquid in series or in parallel, wherein the container assembly comprises:

one or more frangible tabs coupling the respective containers together and at least partially defining the fluidic channels.

11. The apparatus of claim 10, wherein the system further comprises one or more sensors to measure a quantity value of the liquid within the respective containers, wherein the system is to compare the measured quantity value to a reference quantity value to determine when the measured quantity value is within a threshold of the reference quantity value.

12. The apparatus of claim 11, wherein the fluidic network comprises a valve adjacent an entrance into one or more of the containers and the system includes a valve drive assembly that interfaces with the corresponding valves to selectively flow the liquid into the respective containers and wherein the system is to cause the valve drive assembly to actuate the corresponding valve and stop the flow of the liquid into the corresponding container when the measured quantity value is within a threshold of the reference quantity value.

13. The apparatus of claim 10, wherein the system comprises a sealer, and the one or more frangible tabs include one or more closing areas adjacent to the fluidic channels defined by the one or more frangible tabs; and wherein the sealer interacts with the one or more closing areas to close the corresponding fluidic channels and isolate the liquid within the respective containers, wherein the sealer comprises at least one of:

a heating element that is to apply heat to the one or more closing areas to close the corresponding fluidic channels and isolate the liquid within the respective containers, or a laser source that is to apply a laser to the one or more closing areas to close the corresponding fluidic channels and isolate the liquid within the respective containers.

14. A method, comprising:

flowing a liquid through a fluidic network of a framework unitary with: 1) containers of a container assembly, 2) covers covering respective ends of the containers, or 3) both;

filling the containers of the container assembly with the liquid using the fluidic network in series or in parallel, wherein the framework includes layers defining fluidic channels of the fluidic network, and wherein filling the containers of the container assembly includes flowing the liquid through the fluidic channels between the layers, wherein the covers comprise the layers and wherein filling the containers of the container assembly includes flowing the liquid through the fluidic channels of the cover, and sealing a portion of the fluidic channels to isolate the liquid within the containers.

15. The method of claim 14, wherein the framework includes a container framework integral with and coupling the containers together and a cover framework integral with and coupling the covers together and wherein the container framework matingly engages the cover framework and defines the fluidic channels of the fluidic network and wherein filling the containers of the container assembly includes flowing the liquid through the fluidic channels.

16. A method, comprising:

flowing a liquid through a fluidic network of a framework unitary with: 1) containers of a container assembly, 2) covers covering respective ends of the containers, or 3) both; and filling the containers of the container assembly with the liquid using the fluidic network in series or in parallel, wherein the framework includes layers defining fluidic channels of the fluidic network, and wherein filling the containers of the container assembly includes flowing the liquid through the fluidic channels between the layers, and wherein the covers comprise the layers and wherein filling the containers of the container assembly includes flowing the liquid through the fluidic channels of the cover, wherein the covers comprise the layers and are thermally bonded to the ends of the respective containers.

17. The method of claim 16, further comprising sealing a portion of the fluidic channels to isolate the liquid within the containers.

18. The method of claim 16, wherein the containers and the covers comprise the layers and wherein filling the containers of the container assembly includes flowing the liquid through the fluidic channels defined between the containers and the covers.

* * * * *